(12) United States Patent  (10) Patent No.: US 7,450,171 B2
Ide et al.  (45) Date of Patent: Nov. 11, 2008

(54) DISTANCE-MEASURING DEVICE INSTALLED IN CAMERA

(75) Inventors: Masataka Ide, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 992 days.

(21) Appl. No.: 10/690,206

(22) Filed: Oct. 21, 2003

(65) Prior Publication Data

US 2005/0013601 A1 Jan. 20, 2005

Related U.S. Application Data

(62) Division of application No. 09/712,868, filed on Nov. 15, 2000, now Pat. No. 6,785,469.

(30) Foreign Application Priority Data

Nov. 16, 1999 (JP) ............... 11-325972
Nov. 30, 1999 (JP) ............... 11-340753

(51) Int. Cl.
  *H04N 5/232* (2006.01)
  *G03B 3/10* (2006.01)
(52) U.S. Cl. ............... 348/345; 348/349; 396/121
(58) Field of Classification Search ............... 348/345, 348/350, 349, 208.14, 169; 396/89, 121
See application file for complete search history.

(56) References Cited

U.S. PATENT DOCUMENTS 5,285,234 A 2/1994 Hasegawa et al.
5,572,282 A 11/1996 Uchiyama
5,784,655 A * 7/1998 Akashi et al. ............... 396/128
5,995,767 A 11/1999 Lee et al.
6,088,539 A 7/2000 Aoyama
6,308,014 B1 10/2001 Nonaka et al.
6,370,262 B1 4/2002 Kawabata
6,430,370 B1 8/2002 Nonaka
6,434,332 B1 8/2002 Kindaichi
6,552,746 B1 * 4/2003 Yang et al. ............... 348/308
7,071,985 B1 * 7/2006 Onoda et al. ............... 348/349

FOREIGN PATENT DOCUMENTS

JP 8-178637 7/1996
JP 11-025263 1/1999

* cited by examiner

*Primary Examiner*—Nhan T Tran
(74) *Attorney, Agent, or Firm*—Straub and Pokotylo; John C. Pokotylo

(57) ABSTRACT

The present invention provides a distance-measuring device has an AF area sensor that includes an image pick up element formed on a semiconductor substrate for receiving two images having a parallax therebetween, and a photo reception signal processing circuit formed on the semiconductor substrate for processing signals corresponding to light received by the image pick up element. On the basis of sensor data (outline data) obtained by integration executed in the AF area sensor in an outline detection mode, the distance-measuring device detects a main subject in a photography screen, sets a distance-measuring area including the main subject, and measures a distance to the main subject.

4 Claims, 30 Drawing Sheets

FIG. 6C $\begin{cases} 0 & 1 & 0 & 0 & 0 \\ 0 & 0 & 1 & 0 & 0 \\ 0 & 0 & 0 & 1 & 0 \\ 0 & 0 & 0 & 0 & 1 \end{cases}$

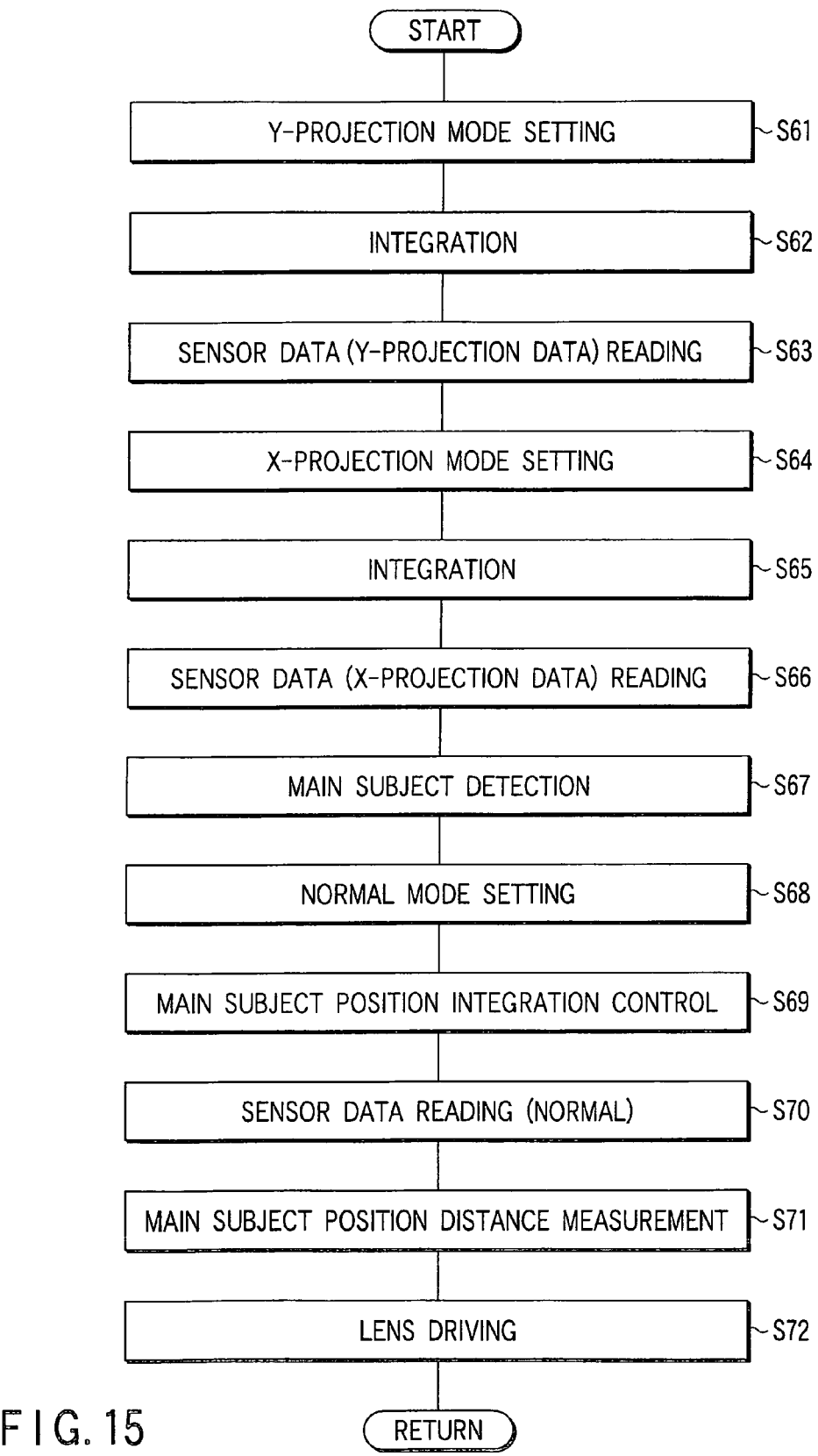
F I G. 15

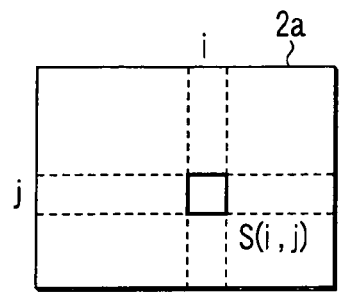
FIG. 24
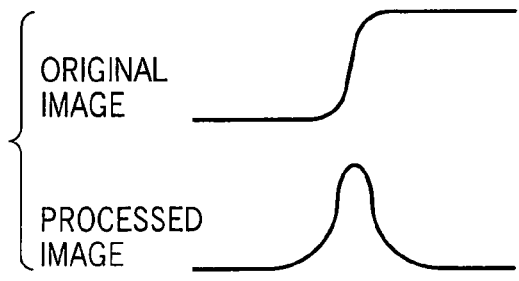
FIG. 25A  FIG. 25B
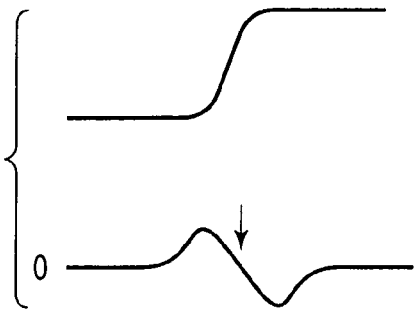
FIG. 26A  FIG. 26B  FIG. 26C
| -1 | 0 | 1 |
|---|---|---|
| -2 | 0 | 2 |
| -1 | 0 | 1 |
\+
| -1 | -2 | -1 |
|---|---|---|
| 0 | 0 | 0 |
| 1 | 2 | 1 |
← (ABSOLUTE VALUE)
FIG. 26D

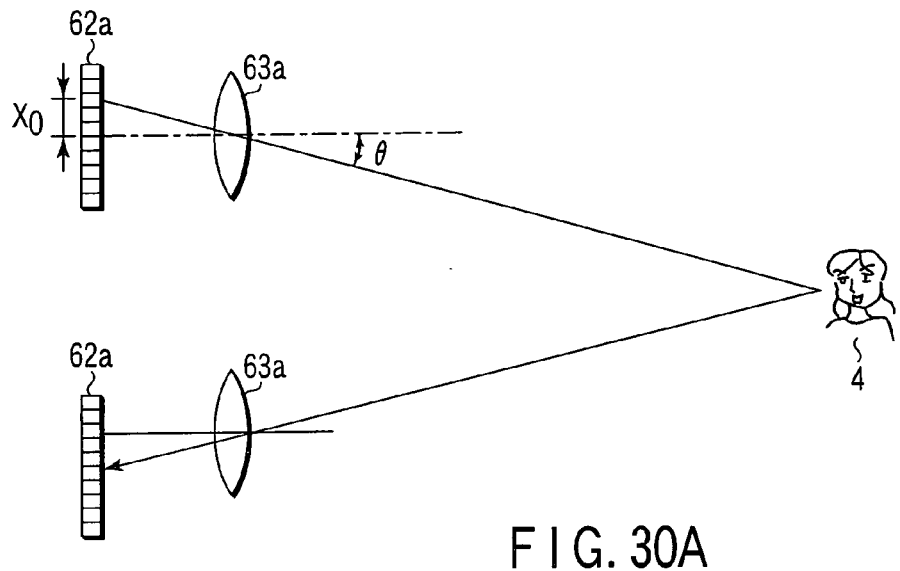
FIG. 30A
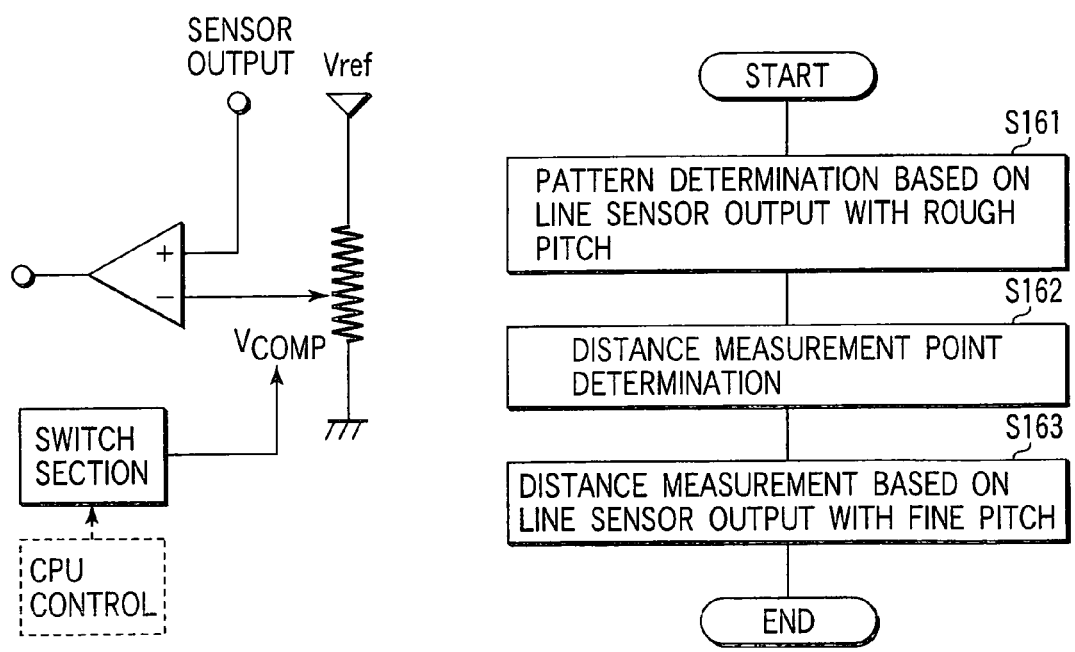
FIG. 30B
FIG. 30C

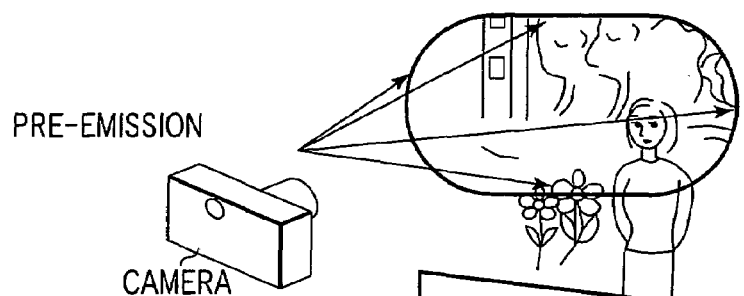
FIG. 33A PRE-EMISSION
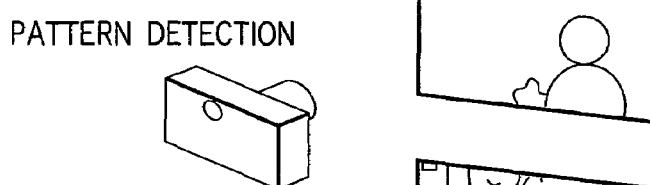
FIG. 33B PATTERN DETECTION
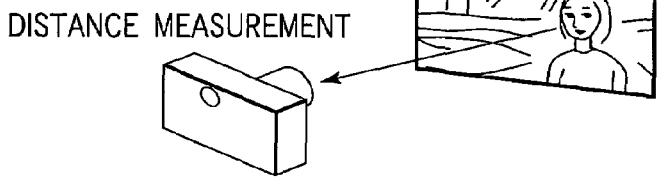
FIG. 33C DISTANCE MEASUREMENT
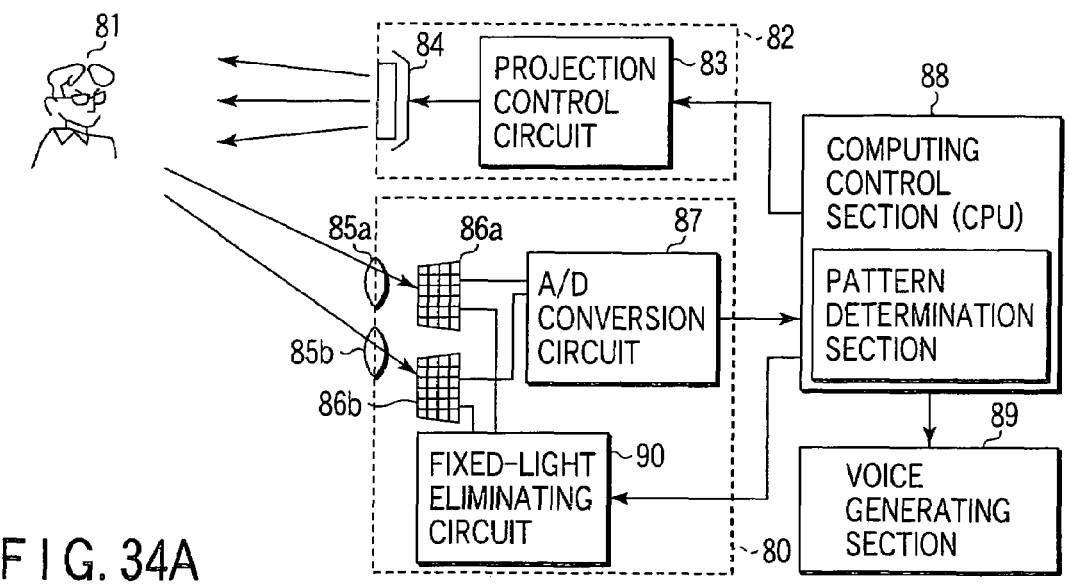
FIG. 34A
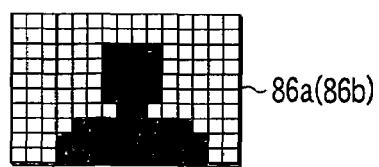
FIG. 34B

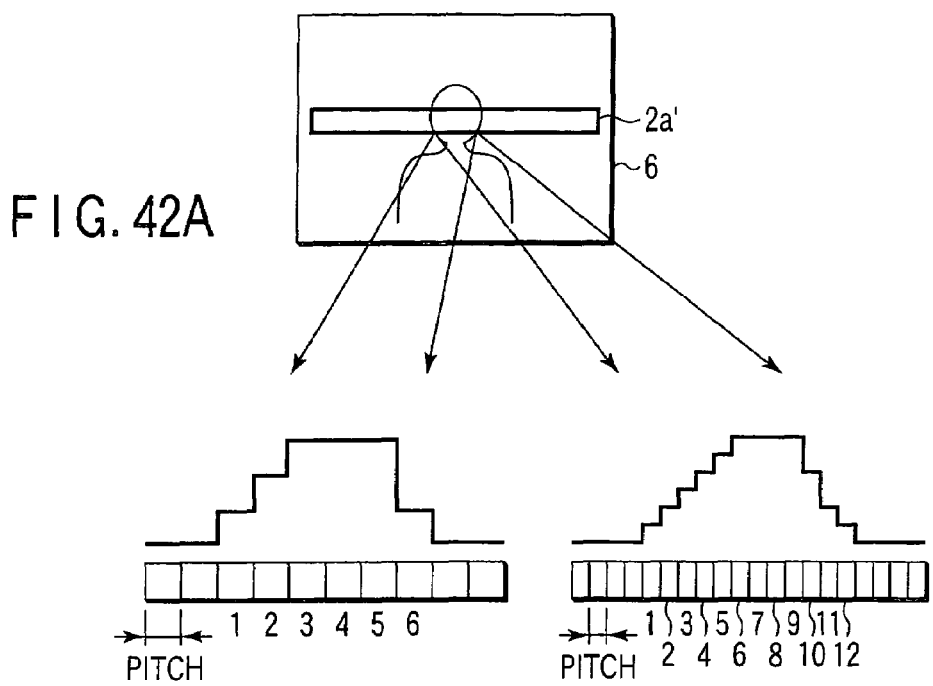
FIG. 42A
FIG. 42B
FIG. 42C
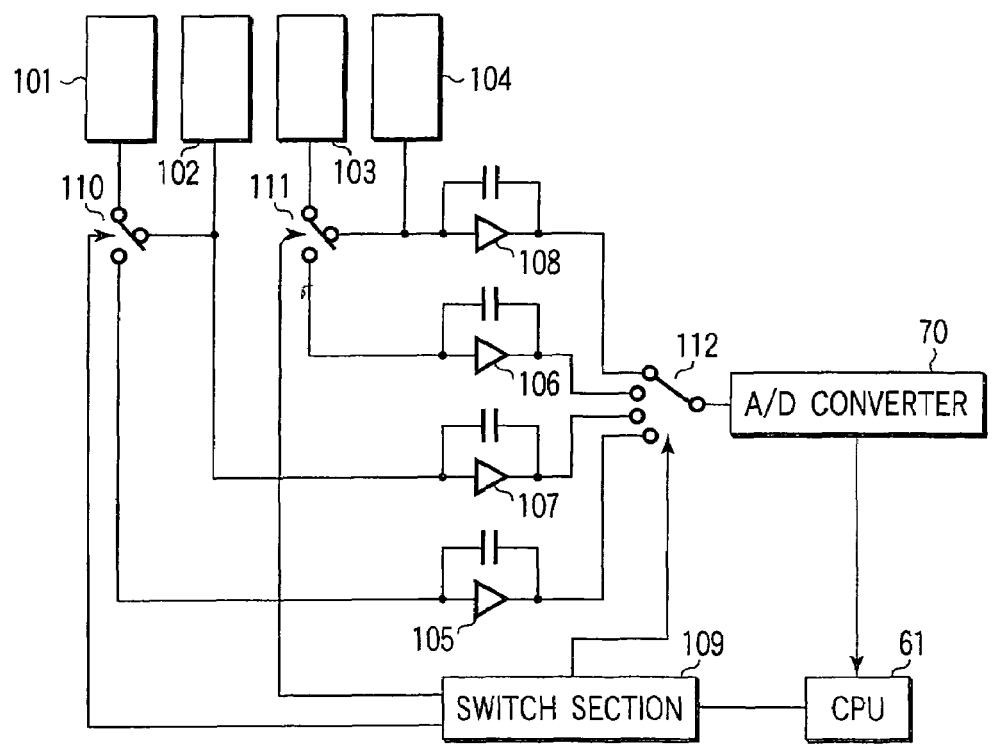
FIG. 43

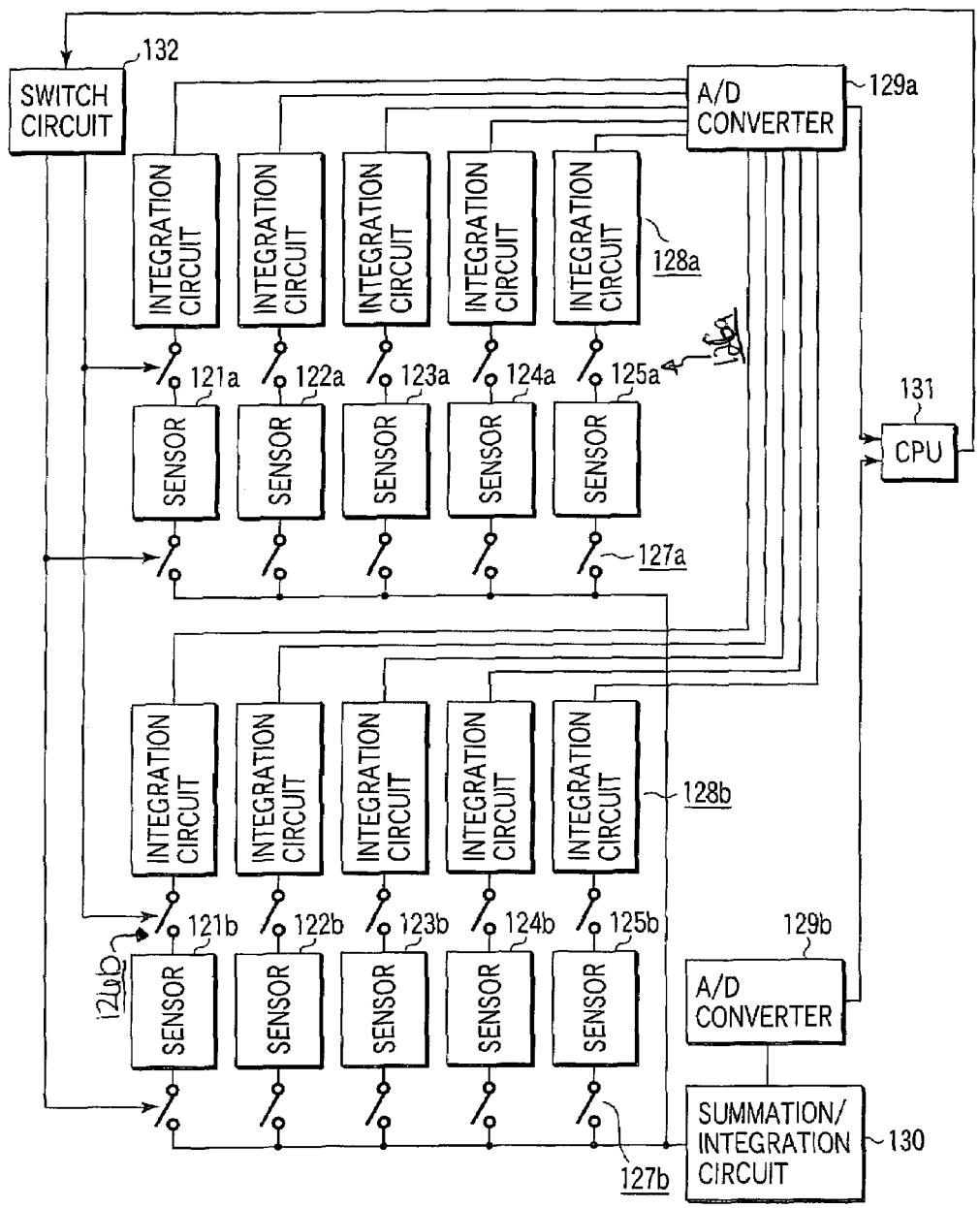
F I G. 46

F I G. 49A
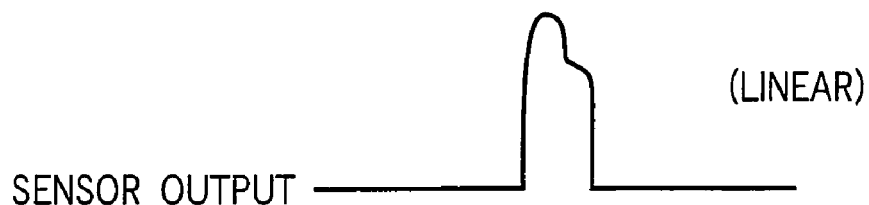
F I G. 49B
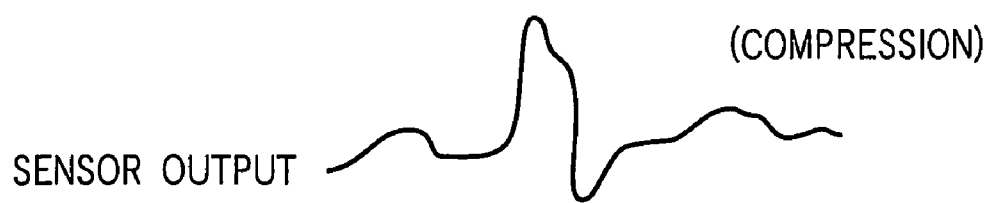
F I G. 49C

DISTANCE-MEASURING DEVICE INSTALLED IN CAMERA

CROSS-REFERENCE TO RELATED APPLICATIONS

This application is a divisional of prior application Ser. No. 09/712,868 filed Nov. 15, 2000 (incorporated herein by reference), which issued as U.S. Pat. No. 6,785,469 on Aug. 31, 2004, and which is based upon and which claims the benefit of priority from the prior Japanese Patent Applications No. 11-325972, filed Nov. 16, 1999; and No. 11-340753, filed Nov. 30, 1999.

BACKGROUND OF THE INVENTION

This invention relates to a distance-measuring device installed in a camera, and more particularly to a distance-measuring device for measuring, at high speed, a subject in a to-be-photographed scene.

In general, a camera incorporates a distance-measuring device for measuring a distance to a subject when picking up the subject so as to focus the photography lens of the camera on the subject.

An active-autofocusing system for applying infrared light to a subject to measure a distance thereto from light reflected therefrom (to execute distance measurement), and a passive-autofocusing system for integrating outside light from a subject to measure a distance thereto, are known as distance-measuring devices. These devices generally employ a line sensor or an area sensor as a photoelectric conversion element for receiving image from the outside and converting it into an electric signal.

An artificial retinal LSI device is known as an image processing device using such an area sensor. In this device, an area sensor having two light receiving areas that are positioned to provide a parallax therebetween, and an image processing circuit for executing various types of data processing on an image signal from the area sensor are mounted in a signal IC chip. The image processing circuit executes edge emphasizing (detection), smoothing, one-dimensional projection, etc.

Japanese Patent Application KOKAI Publication No. 8-178637, for example, discloses an image processing device using an artificial retinal LSI, as the artificial retinal LSI device.

This image processing device extracts the outlines of input images, using an artificial retinal element, calculates, at high speed, correlation between outline data on those portions of the outline images, which are located at the same scanning lines, using a correlation computing device incorporating a synapse connection computing circuit, and obtains information such as a distance to an object or movement of the object, on the basis of the computing result.

However, when the image processing device having the artificial retinal LSI disclosed in Japanese Patent Application KOKAI Publication No. 8-178637 is used in a camera, a CPU, which operates at high speed to execute complicated processing, and/or a correlation calculation unit must be mounted in the camera. These units are expensive, and the number of component parts of the distance-measuring device, and hence the size of the distance-measuring device, inevitably increase because of these units.

Moreover, in the above distance-measuring device, two images are input using two cameras having respective artificial retinal LSIs, and the distance to a subject is measured. That is, distance measurement is executed, on the basis of the correlation of the two images using the principle of stereo. Accordingly, the device is large in size and expensive.

This large distance-measuring device can be installed in, for example, a single lens reflex camera, but not in a small and inexpensive machine such as a compact camera.

In different to-be-photographed scenes, if the camera is to photograph different subjects, it should have the ability to focus on different portions of the subjects. For example, if the main subject is a person, the camera should focus on an upper portion, such as the face, of the person. If, on the other hand, the main subject is scenery or a building, the camera should focus on its center.

Usually, however, a distance-measuring point for a shortest distance to an area in which the main subject seems to exist is selected for focusing.

In light of this, there is a technique for detecting a distinctive portion of a main subject in a to-be-photographed scene, and executing appropriate focusing for the main subject.

Japanese Patent Application KOKAI Publication No. 11-25263, for example, discloses a technique for detecting a distinctive point of a subject (area) existing in a to-be-photographed scene, on the basis of the outline of the subject, the distance distribution of the subject, or the actual size of the subject calculated from the distance distribution and the outline of the subject. On the basis of the detection result, exposure time during photography, for example, is controlled.

In the technique for detecting a distinctive point of a subject, disclosed in Japanese Patent Application KOKAI Publication No. 11-25263, determination of a distance-measuring point is especially important.

More specifically, a sensor section for executing distance measurement often has a structure in which pixels consisting of, for example, photoelectric conversion elements are arranged in a matrix or in a plurality of rows. If this so-called sensor array is also used as an image sensor for detecting a distinctive point of a subject, another sensor and its space dedicated to the detection of the distinctive point are not necessary.

Pattern detection for detecting such a distinctive point does not require such accurate detection of a distribution of reflected light as does distance measurement. More easy detection provides a sufficient result. Therefore, if the pattern detection is executed at the same speed as distance measurement, it is a waste of time.

BRIEF SUMMARY OF THE INVENTION

It is the object of the invention to provide a highly-accurate, short-time-lag, compact and cost-effective distance-measuring device, which incorporates an AF area sensor that includes an image pick up element formed on a semiconductor substrate for receiving two input images having a parallax therebetween, and a photo reception signal processing circuit formed on the semiconductor substrate for creating outline data on a subject on the basis of a photo reception signal from the image pick up element, and which has a wide distance-measuring area and executes distance measurement and pattern detection for detecting a distinctive point of a subject using different computations, to thereby minimize the time required for computations and operations.

According to an aspect of the invention, there is provided a distance-measuring device comprising: two optical systems having a parallax therebetween; an image pick up element formed on a semiconductor substrate for picking up two images formed by the optical systems; image processing means formed on the semiconductor substrate for processing an image output from the image pick up element; main subject detecting means for detecting a main subject on the basis of an output from the image processing means; and distance-measuring means for executing a distance measurement operation, based on the output of the image processing means, on the main subject detected by the main subject detecting means.

According to another aspect of the invention, there is provided a distance-measuring device capable of executing distance measurement at a plurality of points in a photography screen, comprising: a sensor array formed of a plurality of photoelectric elements; an A/D converter for converting outputs of the photoelectric elements into digital data, the A/D converter having a first A/D conversion mode in which conversion is executed at high speed and with low accuracy, and a second A/D conversion mode in which conversion is executed at low speed and with high accuracy; outline judging means for subjecting outputs of the sensor array to A/D conversion executed in the first A/D conversion mode, thereby judging those portions of an outline of a subject, which exist at a plurality of points; determination means for determining that one of the points, at which distance measurement is to be executed, on the basis of the judging result of the outline judging means; and computing means for subjecting that one of the outputs of the sensor array, which corresponds to the point determined by the determination means, to A/D conversion executed in the second A/D conversion mode, thereby executing distance measurement on the basis of the conversion result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A, 6B and 6C are views illustrating the conceptual relationship between the AF sensor and an input image;

FIG. 15 is a flowchart useful in explaining a distance-measuring device according to a second embodiment of the invention;

FIG. 24 is a view useful in explaining edge detection processing;

FIGS. 25A and 25B are views illustrating the distinctives of an original image photographed by the primary differential operator method for edge detection, and the distinctives of an image obtained after processing the original image;

FIGS. 26A, 26B, 26C and 26D are views showing examples of spatial filter tables;

FIGS. 30A, 30B and 30C are views useful in explaining the distance-measuring device, using the principle of triangular distance measurement, according to the eighth embodiment of the invention;

FIGS. 33A, 33B and 33C are views useful in explaining the concept of a distance-measuring device, according to a ninth embodiment, for detecting the position of a main subject at high speed;

FIGS. 34A and 34B are views illustrating a conceptual structure of the distance-measuring device of the ninth embodiment, and an image formed on an area sensor;

FIGS. 42A, 42B and 42C are views illustrating image signals input with a fine pitch and a rough pitch;

FIG. 43 is a view showing an example of a structure for selecting a sensor string to switch over a pixel pitch;

FIG. 46 is a view showing an example of a structure of a switch circuit for switching over a pixel pitch;

FIGS. 49A, 49B and 49C are views showing an example of a to-be-photographed scene in which bright portions are a sharp contrast to dark portions, and its data.

DETAILED DESCRIPTION OF THE INVENTION

The embodiments of the invention will be described in detail with reference to the accompanying drawings.

Figure 1:
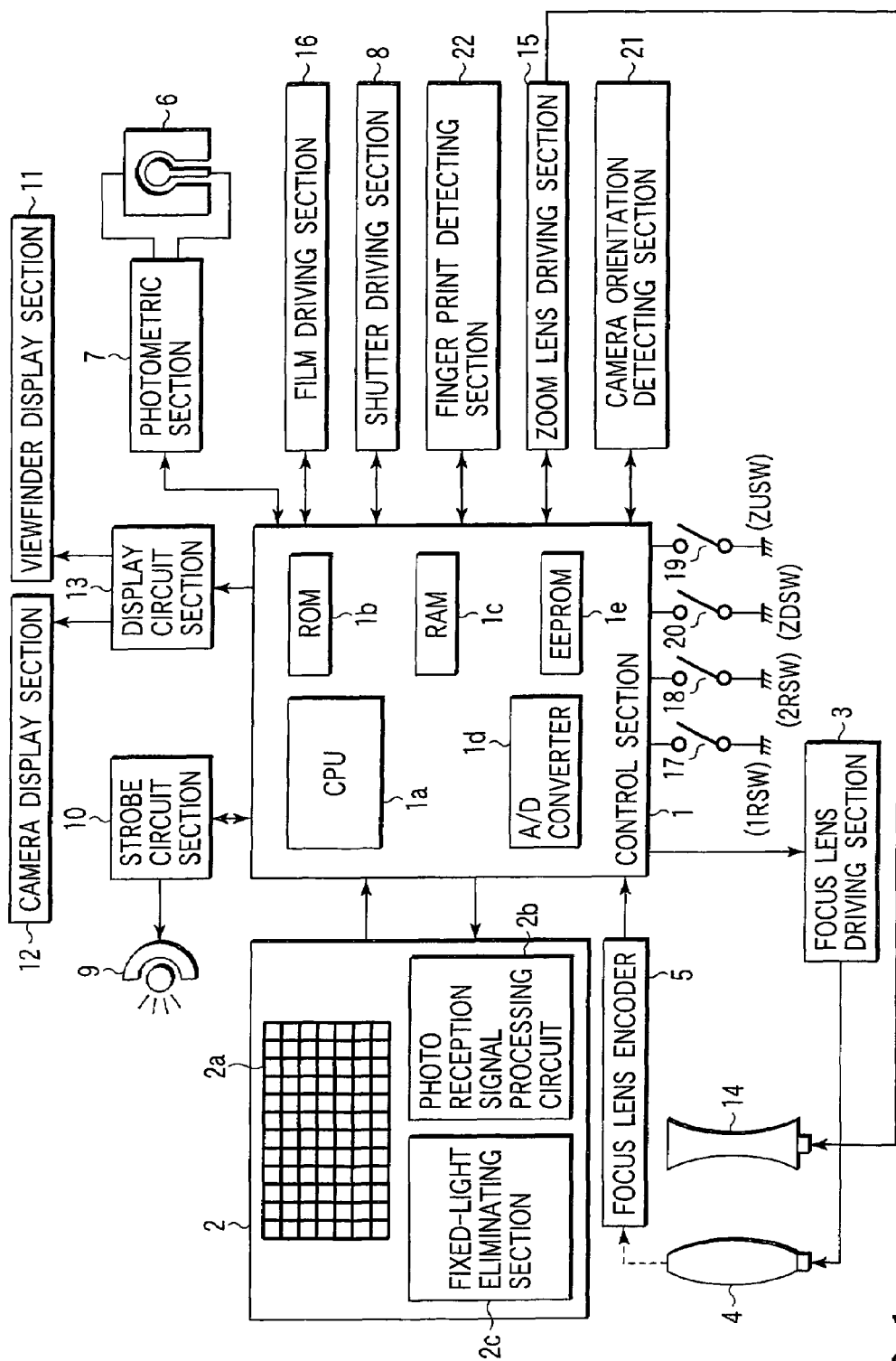
FIG. 1 is a block diagram illustrating a camera incorporating a distance-measuring device according to a first embodiment of the invention.

FIG. 1 schematically shows a camera equipped with a distance-measuring device according to a first embodiment.

This camera comprises: a control section 1 formed of a microcomputer for controlling components parts mentioned below and executing various operations; an AF area sensor 2 used for distance measurement; a focus lens driving section 3 for driving a focus lens 4; a focus lens encoder 5 for generating a pulse signal corresponding to the movement amount of the focus lens 4; a photometric section 7 for processing a photoelectric signal generated by a photometric photoelectric element 6, and outputting a photometry result; a shutter driving section 8 for driving a shutter (not shown); a strobe circuit section 10 for causing a strobe emission unit 9 to emit light as assisting light during photography or as AF assisting light during distance measurement; a viewfinder display section 11 for superimposing information related to the invention on a viewfinder screen including a photography screen; a camera display section 12 provided on the case of the camera and formed of, for example, an LCD, for displaying the number of film portions to be exposed, or a photography mode; a display circuit section 13 for controlling the viewfinder display section 11 and the camera display section 12; a zoom lens driving section 15 for driving a zoom lens 14 to execute zooming (changes in focal distance) and outputting focal distance data to the control section 1; a film driving section 16 for executing auto-loading of a film, winding the film by one exposure, or rewinding the film; and a camera orientation detecting section 21 for detecting the position of the camera (a landscape-size picture taking position, a portrait-size picture taking position).

The control section 1 is connected to a first release switch (1RSW) 17 and a second release switch (2RSW) 18. The control section 1 executes distance calculation when the 1RSW 17 has been closed, and executes an exposure operation and a film winding operation when the 2RSW 18 has been closed.

The control section 1 includes a central processing unit (CPU) 1a; a ROM 1b that stores a sequence of programs relating to photography; a RAM 1c for storing necessary data in a rewritable manner; an A/D converter 1d for converting, into a digital signal, an analog signal indicating, for example, a photometric output from the photometric section 7; and an EEPROM 1e that stores, for example, correction data for each camera related to auto-focusing (AF), photometry/exposure operations, etc., and various parameters used for detecting a main subject in a photography screen, which will be described later.

The AF area sensor 2 has a photoelectric element group 2a in which a plurality of pixel units including, for example, photodiodes, are two-dimensionally arranged in rows and columns in its photography area; a light (e.g., photo reception) signal processing circuit 2b and a fixed light eliminating section 2c. In this structure, the control section 1 controls an integration operation, thereby picking up a subject image formed by a distance-measuring optical system, described later, controlling a pixel amplifying circuit for each pixel so as to convert, into a voltage, a charge generated by the photoelectric element group 2a when light has entered it, and to amplify it and convert it into sensor data. The fixed light eliminating section 2c eliminates a fixed light component from the sensor data, and outputs the resultant data to the control section 1.

The control section 1 then executes distance calculation on the basis of the input sensor data, thereby outputting a driving signal to the focus lens driving section 3, monitoring the output of the focus encoder 5, and adjusting the position of the focus lens 4.

Figure 2:
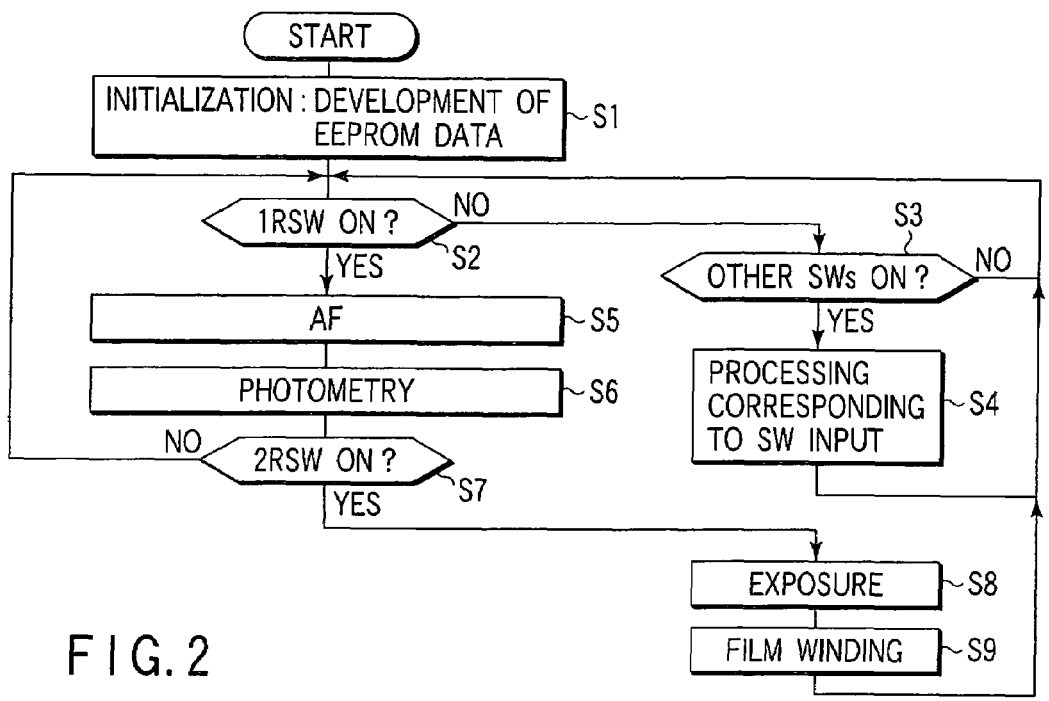
FIG. 2 is a flowchart useful in explaining a main routine for executing photography.

Referring then to the flowchart of FIG. 2, a main routine executed during photography will be described.

When a power switch SW (not shown) or a battery (not shown) has been turned on, the control section 1 is excited to start its operation in accordance with the sequence of programs pre-stored in the ROM 1b.

First, each block in the camera is initialized, and then adjustment/correction data, stored in the EEPROM 1e and related to auto-focusing (AF) or distance measurement, is developed in the RAM 1c (step S1).

Subsequently, it is determined whether or not the 1RSW 17 has been closed (step S2). If it is determined that the 1RSW 17 is in the OFF state (if the answer at the step S2 is NO), it is determined whether or not another switch (other than the 1RSW 17 and the 2RSW 18) has been operated (step S3).

If another switch is operated (if the answer at the step S3 is YES), processing corresponding to the operated switch is executed (for example, if a ZUSW 19 or a DSW 20 is operated, the zoom lens 14 is raised or lowered) (step S4), and the program returns to the step S2. On the other hand, if another switch is not operated (if the answer at the step S3 is NO), the program directly returns to the step S2, thereby keeping the camera in a standby state.

If it is determined at the step S2 that the 1RSW 17 has been closed (the answer is YES), distance measurement (for auto focusing) is executed (step S5), and photometry/exposure operations are executed (step S6).

After that, it is determined whether or not the 2RSW 18 has been closed (step S7). If it is determined that the 2RSW 18 has been closed (if the answer at the step S7 is YES), a shutter operation is executed to expose a portion of a film (step S8). After exposing the film portion, the film is wound by one exposure (step S9), followed by the program returning to the step S2 to thereby keep the camera in the standby state. However, if it is determined that the 2RSW 18 is not closed (if the answer at the step S7 is NO), the program directly returns to the step S2.

Figure 3A:
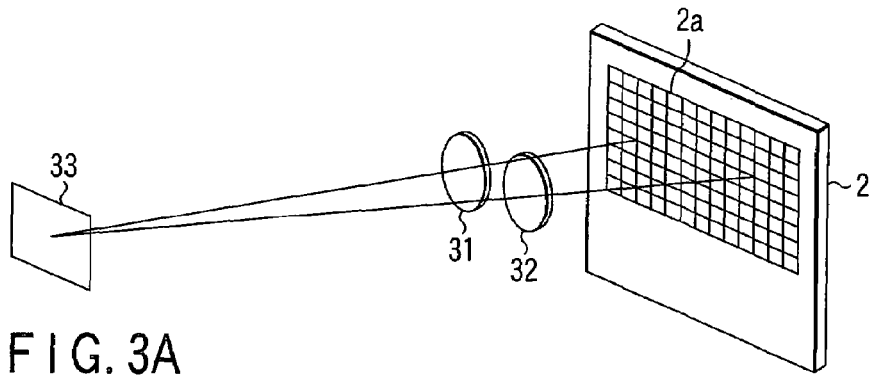
FIGS. 3A and 3B are views useful in explaining a passive-type distance measurement optical system using outside light.
Figure 3B:
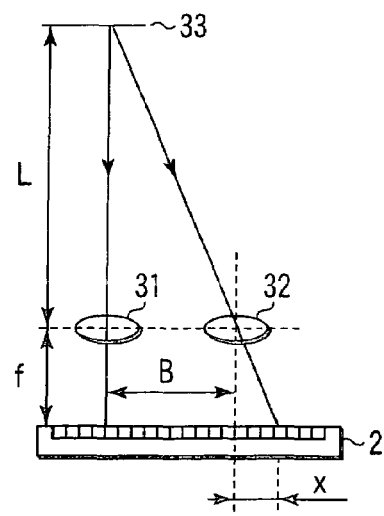

FIGS. 3A and 3B show a conceptual structure of a distance-measuring optical system of the passive type using outside light.

In this structure, light for distance measurement is guided to a light receiving area of the AF area sensor 2, in which the photoelectric element group 2a is arranged, and light receiving lenses 31 and 32 for measuring a distance to a subject 33 are located with a base length B interposed therebetween.

The light receiving lenses 31 and 32 divide an image of the subject 33 into two images and form one image on the photoelectric element group 2a of the AF area sensor 2. On the basis of the principle of triangular distance measurement, the relative positional difference x between the two images, the focal distance f of the lenses and the base length B, and the distance L to the subject satisfy the following equation:

$$L = (B \cdot f)/x$$

This distance calculation is executed by the control section 1. Specifically, a distance-measuring block is set in the light receiving area 2a of the AF area sensor 2, and correlation operation is executed using sensor data corresponding to the two images, thereby detecting the relative positional difference x therebetween.

Figure 4:
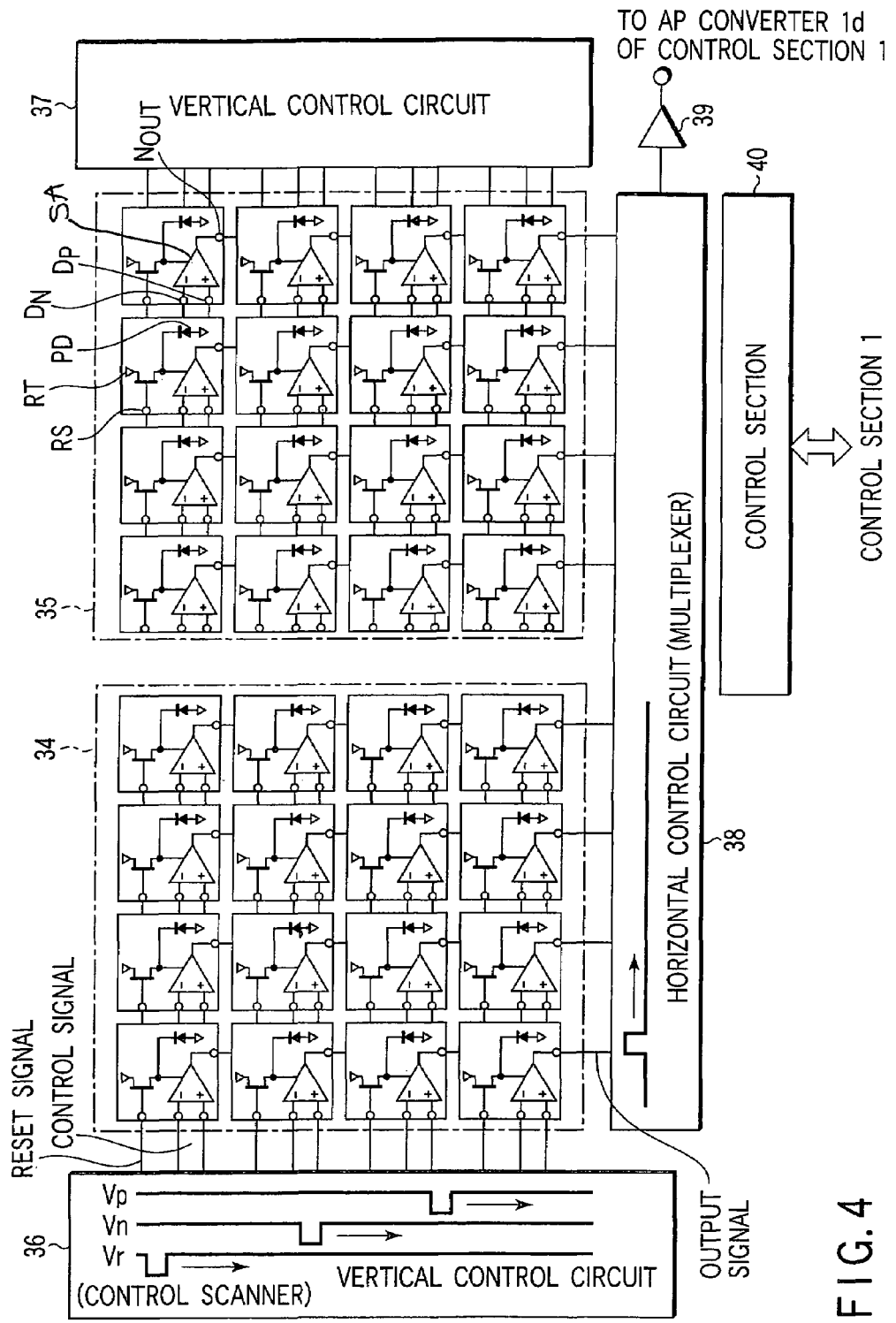
FIG. 4 is a view specifically illustrating the structure of an AF sensor.

FIG. 4 shows an example of a specific structure of the AF area sensor 2.

As shown in FIG. 4, the AF area sensor 2 comprises: pixel areas 34 and 35 (included in the photoelectric element group 2a) for receiving distance measurement light converged by the light receiving lenses 31 and 32 shown in FIG. 3A; vertical control circuits (VC) 36 and 37 functioning as control scanners; a horizontal control circuit (HC) 38 functioning as a multiplexer; an output circuit (OC) 39; and a control circuit (SC) 40 for controlling the operation of the AF area sensor 2 under the control of the control section 1. These areas and circuits are formed on a single silicon substrate by the CMOS process, and the light receiving lenses 31 and 32 are integrally mounted thereon.

Each photoelectric element in the pixel areas 34 and 35 is formed of a photodiode PD as a light receiving section, a differential amplifying circuit SA and a reset transistor RT, and has sensitivity control input terminals DP and DN and a reset terminal RS connected to the vertical control circuits 36 and 37. Output terminals Nout of the photoelectric elements of each column are connected to each other and also to the horizontal control circuit 38. Further, the sensitivity control input terminals DP of the photoelectric elements of each row are connected to each other. Similarly, the sensitivity control input terminals DN (or the reset terminals RS) of the photoelectric elements of each row are connected to each other.

The reset terminal RS is provided for resetting the potential at the PD to a predetermined potential. After the potential at the PD is reset to the predetermined potential by a reset pulse Vr, a signal corresponding to the intensity of incident light is accumulated during a charge accumulating period until a readout pulse is input, whereby the potential reduces in accordance with the amount of the incident light.

Figure 5:
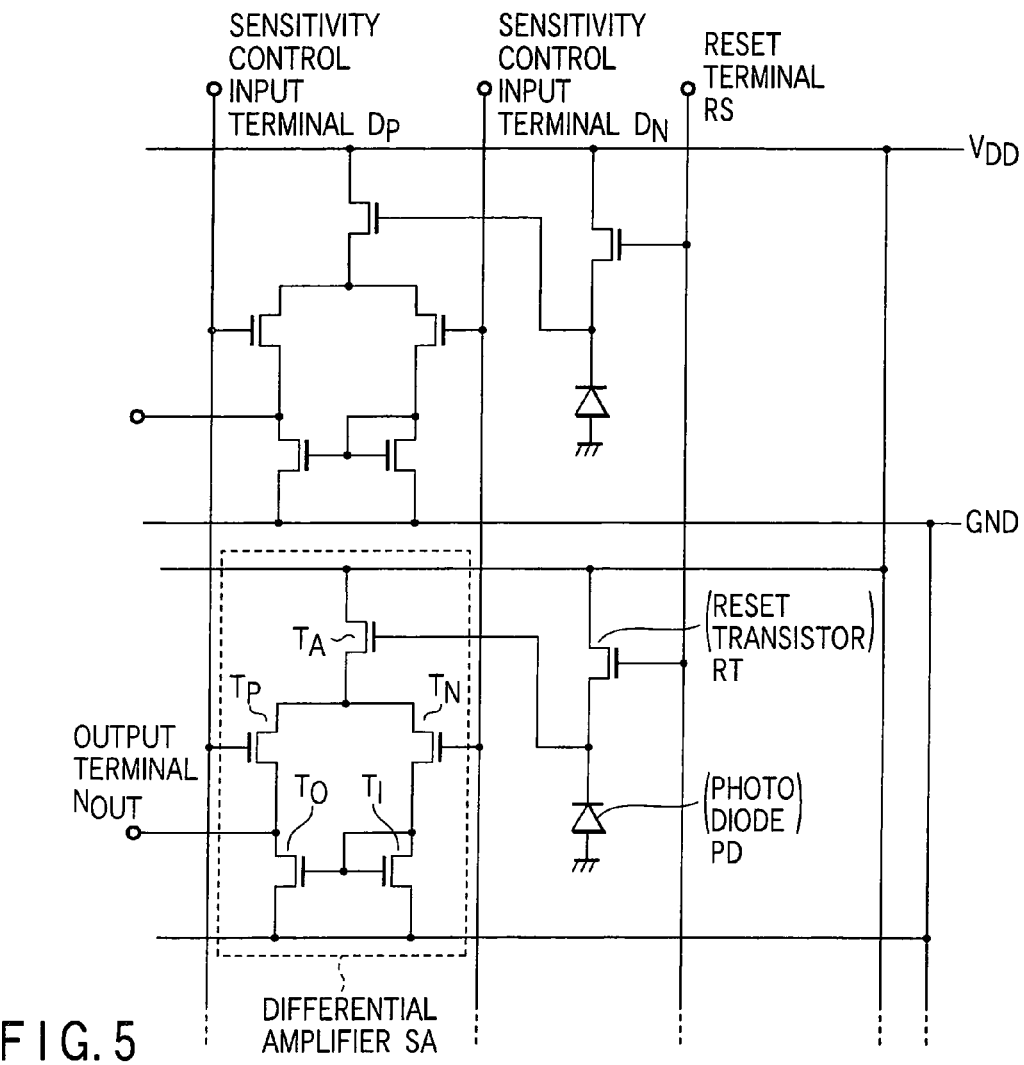
FIG. 5 is a view specifically illustrating a differential amplification circuit SA.

FIG. 5 shows a specific structure of the differential amplifying circuit SA.

The differential amplifying circuit SA comprises NMOS transistors TA, TP, TN, TO and TI connected by current mirror connection.

Further, a photodiode PD and a reset transistor RT are connected in series, while the cathode of the photodiode PD is connected to the gate of the current control transistor TA.

The potential of the photodiode PD of each pixel is read by operating the gate of the current control transistor TA of the differential amplifying circuit SA. Positive and negative current outputs proportional to the potential of the photodiode PD of each pixel are obtained from the output terminal Nout by supplying control signals VP, VN to the sensitivity control terminals DP and DN of each pixel, respectively.

If no voltage is applied to the sensitivity control terminals DP and DN, the current output of the pixel becomes 0. When applying "1" and "0" to the sensitivity control terminal DP for controlling a positive output current, and the sensitivity control terminal DN, respectively, thereby turning on the transistor TP and turning off the transistor TO, a current corresponding to the potential of the sensitivity control terminal PD is output from the output terminal Nout via the transistors TA and TP.

On the other hand, when applying "1" and "0" to the sensitivity control terminal DN for controlling a negative output current, and the sensitivity control terminal DP, respectively, thereby turning on the transistor TN and turning off the transistor TP, a current corresponding to the potential of the sensitivity control terminal PD is guided to the transistors TA and TI, and is returned by a current mirror. After that, a current corresponding to the potential of the photodiode PD is received by the transistor TO via the output terminal Nout.

Since the output terminals Nout of pixels arranged in the same row are connected to each other, the current output Nout of the pixels are summed.

Accordingly, where, as shown in FIG. 6, the pulse signal VP is applied to the third and fourth rows, and the pulse signal VN is applied to the second and fifth rows, the four pixels have the same values as obtained in the case of execution of filtering to multiply respective image data items entering the pixels by weighting coefficients (−1, 1, −1, 1).

The aforementioned current output Nout is scanned and selected by the horizontal control circuit 38, converted into a voltage output by the output circuit 39, and input to the AD converter 1d in the control section 1. Supposing that a sensitivity control signal vector is represented by S and the two-dimensional matrix of input image data is represented by W, a correlation signal W·S is obtained when the voltage output has been generated.

Since sensitivity control data is transferred by the vertical control circuits 36 and 37, the sensitivity control signal S sequentially shifts in units of one bit.

As a result, applying various pulse voltage signals VP, VN to the vertical control circuits 36 and 37 and executing scanning enables detection of an image itself and also the outline of the image, resolution change, compression of two-dimensional data into one-dimensional one, etc.

Specifically, a positive image (a usual image) can be obtained by sequentially shifting the sensitivity control signal vector S (1, 0, 0, . . . , 0) to S (0, 1, 0, . . . , 0), S (0, 0, 1, . . . , 0). Further, the data difference between horizontally adjacent pixels can be obtained by sequentially shifting S (1, −1, 0, . . . , 0), whereby the horizontal outline of an image can be extracted.

Moreover, shifting of S (1, 1, 0, . . . , 0) provides an output obtained by summing data of two pixels, thereby changing the resolution of an image. Similarly, in the case of S (1, 1, 1, 0, . . . , 0), data of three pixels are summed, thereby changing the resolution.

In the case of S (1, 1, 1, . . . , 1), horizontal output signals are summed and one-dimensional projection data is obtained. A control section 40 sets the sensitivity control signal under the control of the control section 1.

The manner of outline detection will be described in detail.

Figure 6A:
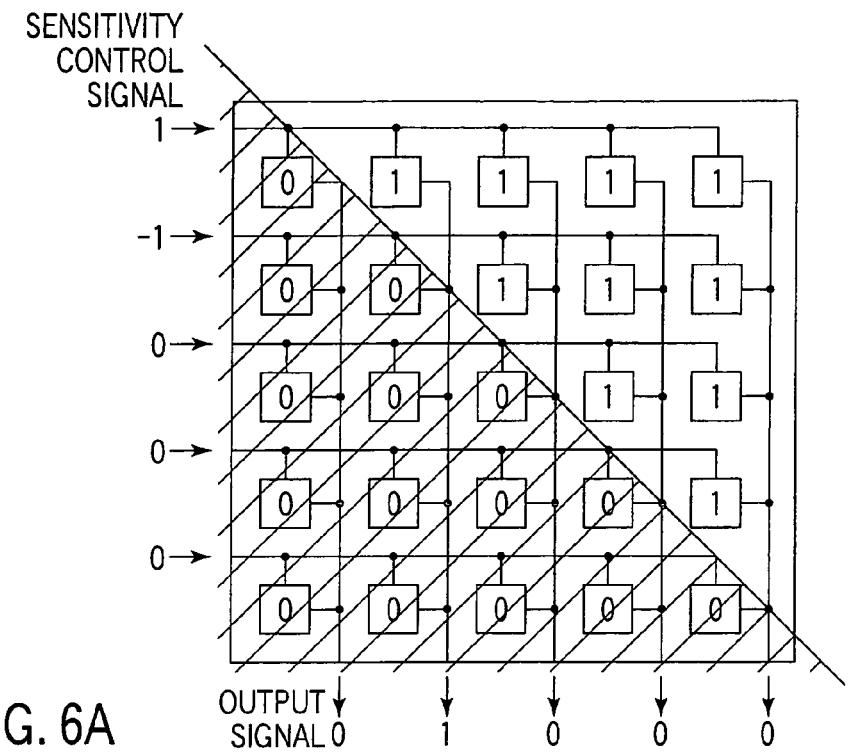
Figure 6B:
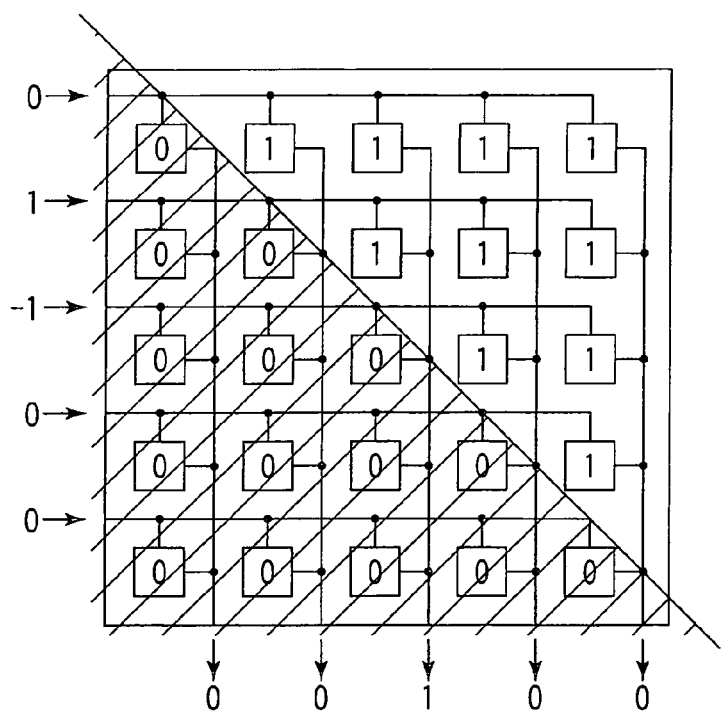

FIGS. 6A and 6B show the conceptual relationship between the AF area sensor 2 and an input image. In the case shown in FIGS. 6A and 6B, light enters an upper right portion of the AF area sensor 2, and does not enter the lower left hatched portion of the sensor 2.

When voltages "1" and "−1" as sensitivity control signals have been applied to sensitivity variable elements arranged in the first and second rows of the sensor 2, respectively, as shown in FIG. 6A (S (1, −1, 0, 0, 0)), the outputs of those of the sensitivity variable elements of the first and second rows, at which the same light intensity is found, are summed in the column direction, and hence an output "0" is obtained from the first and third-fifth columns.

On the other hand, an output "1" not "0" is obtained only from those of the sensitivity variable elements of the first and second rows, at which different light intensities are found (i.e. the output of the second column). In other words, part of an outline is detected.

Subsequently, the voltages "1" and "−1" as the sensitivity control signals have been applied to sensitivity variable elements arranged in the second and third rows of the sensor 2, respectively, as shown in FIG. 6B (S(0, 1, −1, 0, 0)). Then, the outputs of those of the sensitivity variable elements of the second and third rows, at which the same light intensity is found, are summed in the column direction, and hence the output "0" is obtained from the first, second, fourth and fifth columns). Further, the output "1" not "0" is obtained only from those of the sensitivity variable elements of the second and third rows, at which different light intensities are found (i.e. the output of the third column).

Repeating the scanning operation while sequentially shifting the rows, as described above, to which the control signal voltages are applied provides a matrix of output signals as shown in FIG. 6C.

Thus, part of an outline corresponding to one scanning line can be detected simultaneously in a parallel manner, thereby providing a matrix concerning outline data.

Figure 7:
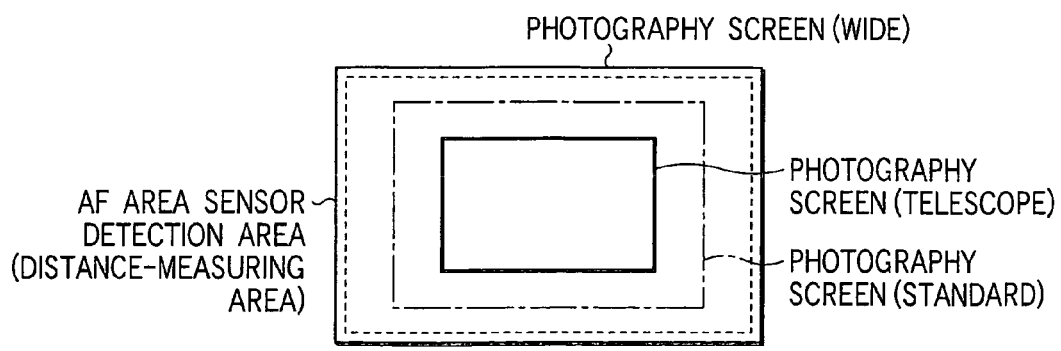
FIG. 7 is a view illustrating the relationship between a distance-measuring area and the wide-end and telescopic-end sizes of a photography screen.

FIG. 7 shows the relationship between a distance-measuring area and the wide-end and telescopic-end sizes of a photography screen.

Since this embodiment employs a distance-measuring system using outside light, a parallax exists between a zoomed photography screen and the distance-measuring area.

In light of this, an area used for distance measurement is limited in accordance with the focal distance data (zoom data) of a photographic optical system. The EEPROM 1e pre-stores distance-measuring area position correction data corresponding to changes in focal distance, which is read and developed in the RAM 1c when the control section 1 is initialized.

In accordance with a zooming operation by the zooming lens driving section, the correction data is referred to in order to determine a distance-measuring area, used for distance calculation, of the light receiving area of the AF area sensor 2. On the basis of sensor data obtained in the distance-measuring area, distance calculation is executed.

Further, the control section 1 supplies the AF area sensor 2 with a control signal for controlling the sensor 2 so as to generate an integration control peak monitor signal corresponding to the distance-measuring area. The AF area sensor 2, in turn, supplies the control section 1 with a peak signal in the designated distance-measuring area. The control section 1 adjusts the amount of integration to a predetermined value with reference to the monitor signal.

This is done to prevent a subject from influencing the outside of the photography screen. Also when reading sensor data, distance-measuring area correction data corresponding to the photography screen is referred to, and unnecessary sensor data on the outside of the photography screen is ignored and not stored in the RAM 1c. Alternatively, a read area setting signal is output to the AF area sensor 2 so that only sensor data in the set area will be output.

Referring then to the flowchart of FIG. 8, an AF routine executed in the distance-measuring device of this embodiment will be described.

First, an operation section incorporated in the camera is operated to set an outline detection mode for the AF area sensor 2 (step S11).

Subsequently, the control section 1 outputs an integration control signal to the AF area sensor 2 to cause the sensor 2 to execute an integration operation (step S12). The AF area sensor 2 outputs a monitor signal corresponding to a peak output (the output of a brightest pixel) in a predetermined area. Referring to the monitor signal, period of integration is controlled so that the amount of light received by the light receiving section 2a of the AF area sensor 2 will be an appropriate value. Integrated sensor data (outline data) is read from the AF area sensor 2 in accordance with a reading clock signal output from the control section 1, then subjected to A/D conversion executed by the AD converter 1d, and stored in the RAM 1c.

After that, the central processing unit 1a executes processing for extracting a main subject (step S13). It is determined whether or not the extracted object is the main subject (step S14), thereby setting a distance-measuring area including the main subject and executing distance calculation (step S15).

On the basis of distance measurement data obtained by the distance calculation, the focus lens driving section 3 drives the focus lens 4 (step S16).

Referring to the flowchart of FIG. 9, a main subject detection routine will be described. In this routine, a person, for example, is supposed to be a main subject, and a procedure for detecting the person will be described. Although two images are obtained by the AF area sensor 2, it is sufficient if at least one of the two images is used as image data (sensor data) for detecting the main subject.

The sensor data obtained by the AF area sensor 2 is stored in the RAM 1c incorporated in the control section 1, and the following processing is executed on the basis of this sensor data.

First, read sensor data is subjected to smoothing processing (step S21). This smoothing processing is a process for eliminating random noise contained in an image by filtering processing or Fourier transform. This random noise is inherent in the AF area sensor 2 itself or caused by external noise that occurs, for example, when a power supply voltage supplied to the AF area sensor 2 fluctuates.

More specifically, the smoothing processing is processing for eliminating random noise contained in an image. This processing is executed by various methods. For example, it is effectively executed using a median filter for providing the median of pixel values in an area near a distance-measuring area, or using an edge reserving filter for dividing the area near the distance-measuring area into small regions, obtaining variance in each small region, obtaining that one of the small regions which has minimum variance, and outputting the average value of variances. The edge reserving filter is more effective than the median filter, since the edge of an image can be maintained more sharp when using the former filter. Further, Fourier transform may be used to execute the smoothing processing, in place of using these filters.

After that, the to-be-binarized image is subjected to processing based on a predetermined threshold level, thereby extracting part of image data lower than the predetermined level to obtain a binary image (step S22).

Then, the central processing unit 1a executes labeling and figure combining processing on the binary image (step S23), thereby obtaining a figure having a certain width corresponding to an edge obtained by line thinning processing (step S24). The line width of this figure is reduced to about 1, using line thinning algorithm.

Subsequently, the shape of the image is determined by shape determination processing, described later, thereby extracting the main subject (step S25).

Figure 10:
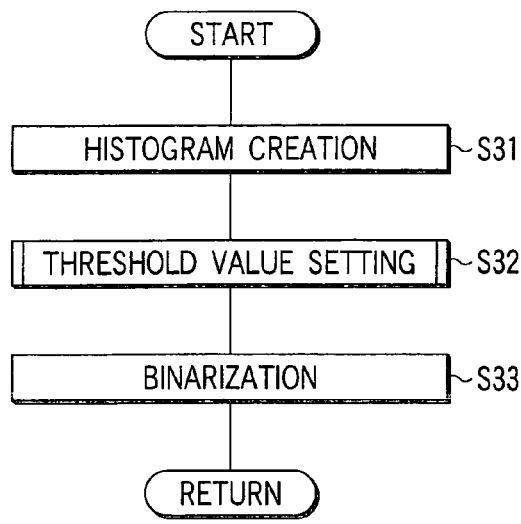
FIG. 10 is a flowchart useful in explaining binarization processing.(processing based on a threshold level)

Referring now to the flowchart of FIG. 10, binarization processing (processing based on a threshold level) will be described.

First, a histogram is created which indicates the appearance frequency of each of pixel values corresponding to respective brightnesses of an image (step S31).

Figure 11A:
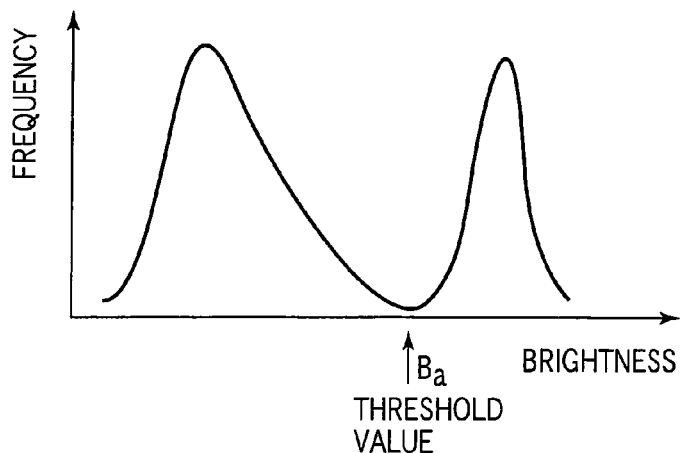
FIGS. 11A and 11B are views each illustrating the relationship between the brightness and the frequency for setting a threshold level.

Subsequently, a threshold level is set on the basis of a threshold level setting histogram (step S32). Various methods can be used for this setting. For example, if a mode method is used, the brightness that appears at a minimum frequency is set at the threshold level (See FIG. 11A, for example). Binarization processing is then performed based on the threshold level (step S33).

The threshold level can be set by other methods such as a p-tile method that is effectively used when the area of a to-be-extracted figure is roughly known in advance, a differential histogram method for setting a threshold level so that a boundary portion of the figure will have the level, a determination analysis method for obtaining a parameter t that enables clear separation of two classes into which density levels are classified, or a method using a variable threshold level for changing a threshold level in accordance with a position on an image. These methods are selectively used, depending upon the situation.

For example, the shape of a histogram is determined, thereby determining whether or not a definite minimum value exists, and the mode method is employed if the definite minimum value exists. On the other hand, if it does not exist, the determination analysis method is employed. Thus, histogram shape determination is executed, and the threshold level setting method is changed on the basis of the determination result.

Figure 11B:
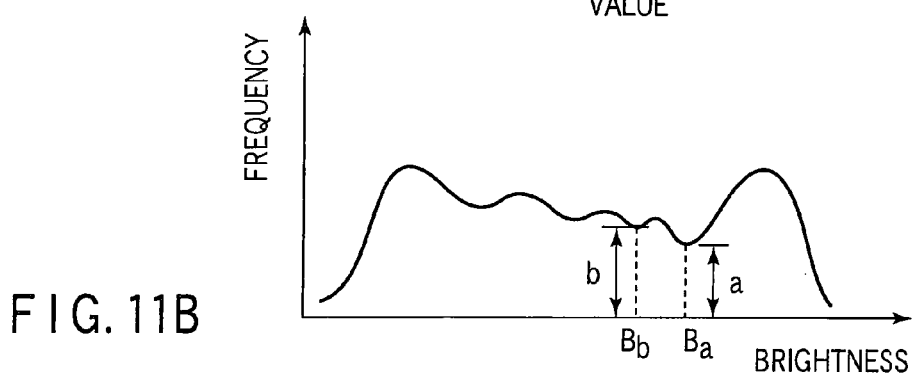

Concerning the histogram shape determining method, an extreme and first minimum frequency value a and an extreme secondmost minimum frequency value b as shown in FIG. 11B are obtained, and the difference therebetween (b−a) is compared with a predetermined judgment value dth. If the difference is higher than the predetermined value dth, a brightness corresponding to the first minimum frequency value a is used as the threshold level. On the other hand, if the difference is lower than the predetermined value dth, the variable threshold level method for varying the threshold level in accordance with a position on an image is employed.

Figure 12:
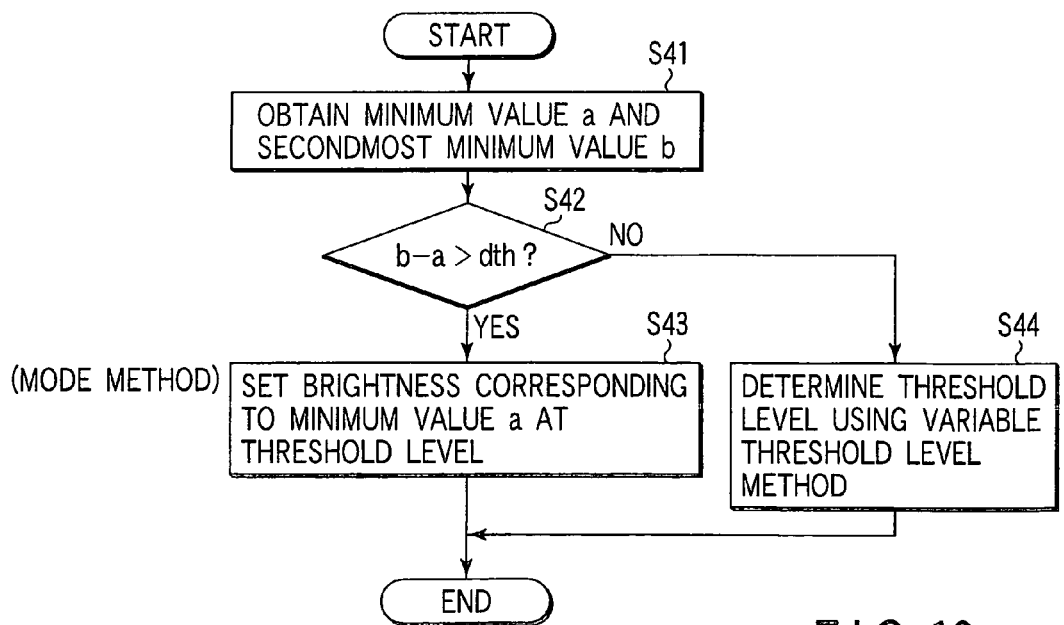
FIG. 12 is a flowchart useful in explaining threshold level setting processing.

Referring to the flowchart of FIG. 12, the threshold level setting processing will be described.

First, the first minimum value a and the secondmost minimum value b are obtained (step S41). Subsequently, it is determined whether or not the difference (b−a) is higher than the predetermined judgment value dth (step S42).

If it is determined that the difference (b−a) is higher than the judgment value dth (i.e. if the answer at the step S42 is YES), a brightness Ba corresponding to the first minimum value a is employed (step S43). However, if it is determined that the difference (b−a) is lower than the judgment value dth (i.e. if the answer at the step S42 is NO), the variable threshold level method is employed (step S44).

This embodiment may be modified as follows. At first, an image corresponding to the entire photography screen is binarized on the basis of a threshold level set by the mode method. If the estimation result of the resultant binary image is not satisfactory, the original image is divided into a plurality of blocks, and a histogram is created for each block, thereby setting a threshold level for each block.

The labeling and figure combining processing will be described.

Labeling is executed on a group of the continuous portion of an image, in which pixels of the same brightness are continuously arranged. Specifically, as shown in FIG. 14B, different labels 1-3 are attached to different continuous portions to separate them.

Further, in the figure combining processing, it is necessary to eliminate a small area figure, such as a hole, or a figure in the form of a dot contained in the image, since these figures are not necessary, and further they may serve as noise and adversely affect processing executed later. Noise is eliminated by increasing or reducing the size of the original figure.

The line thinning processing will be described.

This is a process of thinning the binary image to a line figure of a line width 1 without degrading the continuity of the continuous portions contained in the image. Specifically, the centerline of a line figure with a certain line width is obtained by sequentially removing pixels in the width direction of the figure.

The dimension of a shape determining continuous area is determined from the number of pixels belonging to a continuous area, while the circumferential length of the area is determined from the number of pixels located at the boundary of the continuous area. However, the oblique length is obtained by multiplying the horizontal or vertical length by $\sqrt{2}$. To determine the shape of an image, coefficient e as given by the following equation is used.

$$e = (\text{circumferential length})^2 / (\text{area})$$

The coefficient e has a minimum value when the shape is circular, and a higher value when the shape is more complicated. Since the face of a person is considered substantially circular, it is determined whether or not the image is the face of a person, by comparing the coefficient e with a predetermined value. It is also determined whether or not the continuous area is the face of a person, by comparing the dimension of the continuous area with a predetermined value.

Further, the shape determining processing may not be executed if the dimension of the continuous area does not fall within a predetermined range, which indicates that the area is not a person. In this case, the amount of operation and hence the AF time lag can be reduced.

Figure 13:
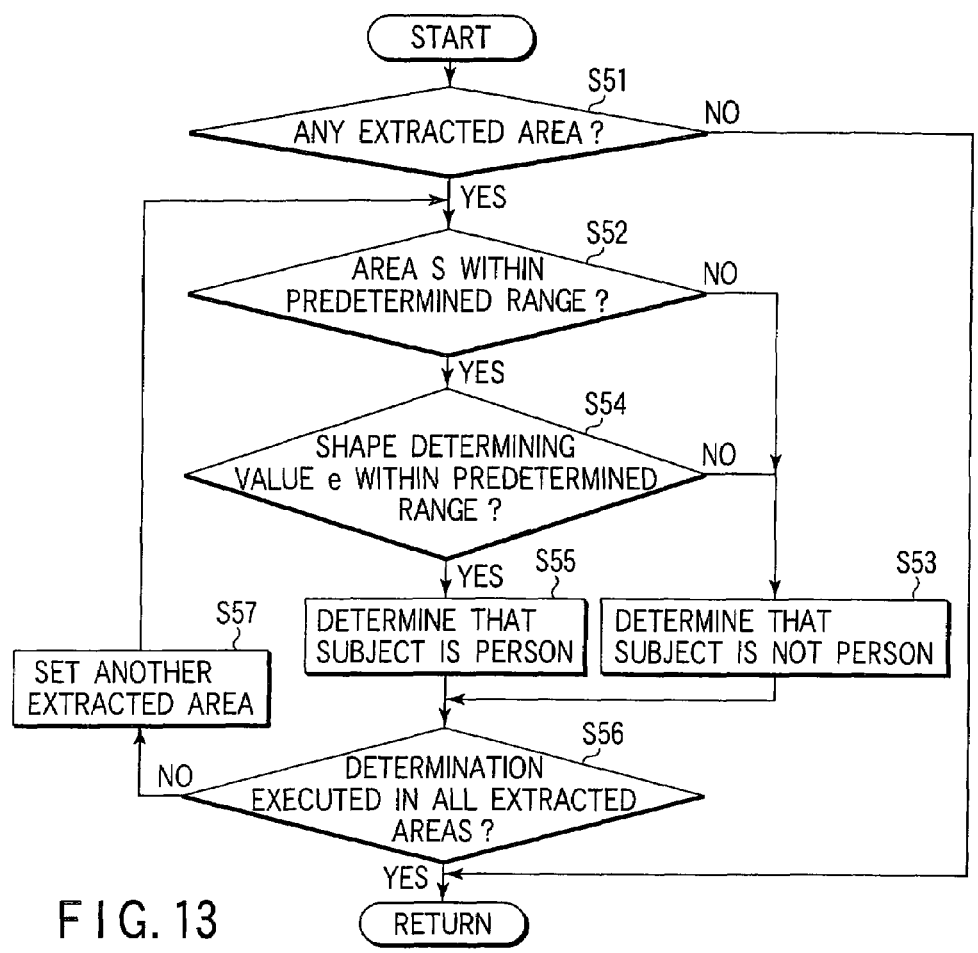
FIG. 13 is a flowchart useful in explaining shape determination processing.

Referring to the flowchart of FIG. 13, the shape determining processing will be described.

It is determined whether or not any extracted area exists, and if there is no extracted area (i.e. if the answer is NO), the program returns to the start (step S51). If, however, there is an extracted area (i.e. if the answer at the step S51 is YES), the dimension S of the extracted area is calculated, thereby determining whether or not the area S falls within a predetermined range (step S52).

If the extracted area dimension S does not fall within the predetermined range (i.e. if the answer at the step S52 is NO), it is determined that the subject is other than a person (step S53), the program returns to the start. If, on the other hand, the extracted area dimension S falls within the predetermined range (i.e. if the answer at the step S52 is YES), a shape determination value e is calculated, thereby determining whether or not the value e falls within a predetermined range (step S54). If the shape determination value e falls within the predetermined range (i.e. if the answer at the step S54 is YES), it is determined that the subject is a person (step S55). If the value e does not fall within the predetermined range (i.e. if the answer at the step S54 is NO), the program returns to the step S53, where it is determined that the subject is other than a person.

After that, it is determined whether or not shape determination has been executed on all extracted areas (step S56), and if it is determined that the shape determination has been executed on all extracted areas (i.e. the answer at the step S56 is YES), the program returns to the start. If the shape determination has not yet been executed on all extracted areas (i.e. the answer at the step S56 is NO), another extracted area is set (step S57), and the program returns to the step S52, thereby repeating the above processing.

Figures 14A, 14C:
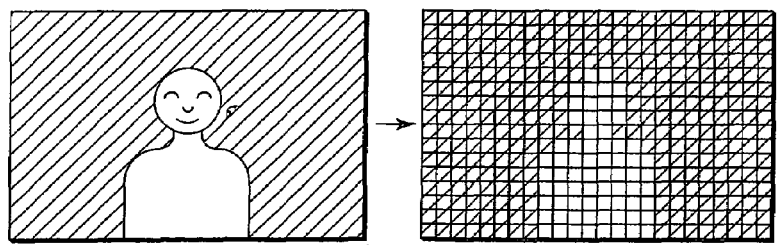
FIGS. 14A, 14B, 14C and 14D are views illustrating examples of to-be-photographed scenes for determining a person, outline data obtained after the scenes are subjected to binarization processing, low resolution data and low resolution outline data.
Figures 14B, 14D:
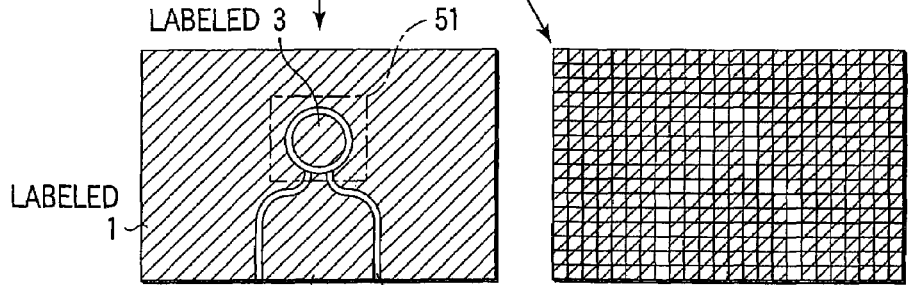

FIG. 14A illustrates a photography screen for picking up a person. FIG. 14B illustrates outline data obtained after binarization processing, FIG. 14C low resolution data, and FIG. 14D low resolution outline data.

This photography screen corresponds to the image area of the AF area sensor 2 and includes a person as a subject. The outline data output from the AF area sensor 2 is binarized, thereby extracting only an edge portion (outline) 53 of the image as shown in FIG. 14B. The image having the extracted edge portion 53 is divided into sections labeled 1, 2 and 3 by the labeling process.

The area labeled 3, which is determined to be the face of a person, is extracted, and a distance-measuring area 51 including the person judgment area labeled 3 is set. Then, distance calculation is executed on the basis of-outline data (obtained before binarization processing) in the distance-measuring area 51.

Since the outline data is obtained by a circuit incorporated in the AF area sensor, it can be obtained much faster than in the case of other operation processing such as difference processing. Thus, a distance-measuring device with a small time lag is realized.

Referring then to the flowchart of FIG. 15, a distance-measuring device according to a second embodiment of the invention will be described.

Since this embodiment has substantially the same structure as the first embodiment, a detailed description will be given not of the structure, but of a different distance measurement routine.

First, an operation section incorporated in the camera is operated to set a y-projection detection mode for the AF area sensor 2 (step S61). Subsequently, the control section 1 outputs an integration control signal to the AF area sensor 2, thereby making the sensor 2 execute integration processing (step S62).

The AF area sensor 2 outputs a monitor signal corresponding to a peak output (the output of a brightest pixel) in a predetermined area. Referring to the monitor signal, the period of integration is controlled so that the amount of light received by the light receiving section 2a of the AF area sensor 2 will be an appropriate value.

Figure 16:
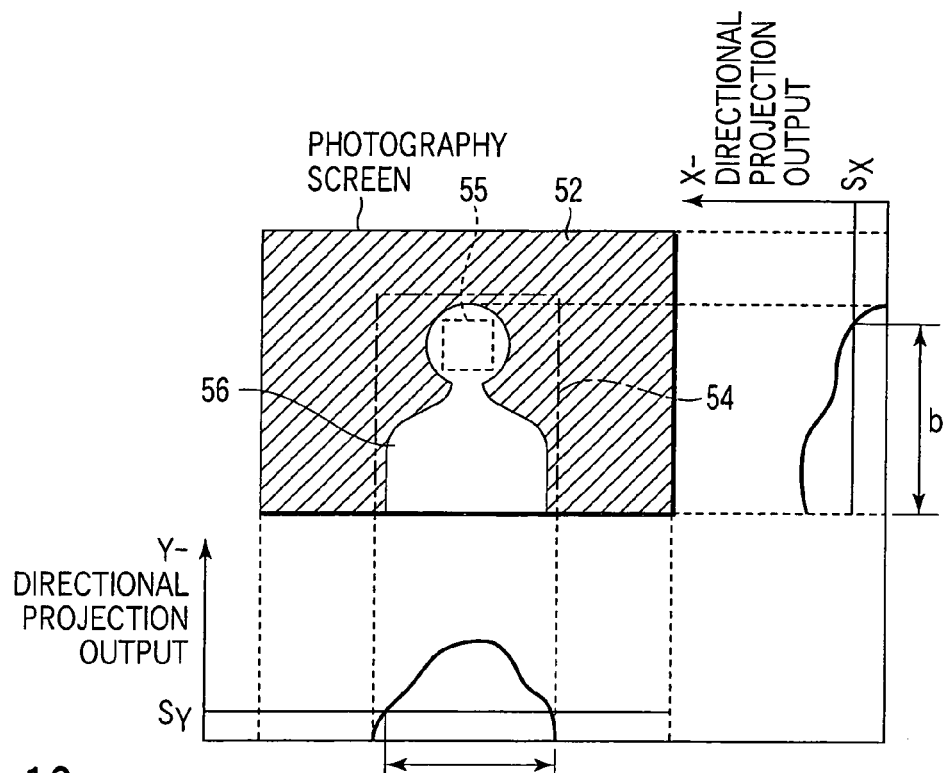
FIG. 16 is a view illustrating the relationship between a photography screen and a projection output in an AF routine in the second embodiment.

After that, as shown in FIG. 16, sensor data (y-projection data) obtained by predetermined integration is read from the AF area sensor 2 in accordance with a reading clock signal output from the control section 1, then subjected to A/D conversion executed by the AD converter 1d, and stored in the RAM 1c (step S63).

Similarly, an x-projection detection mode is set for the AF area sensor 2 (step S64), and the control section 1 outputs an integration control signal to the AF area sensor 2, thereby making the sensor 2 execute integration processing (step S65). After that, as shown in FIG. 16, sensor data (x-projection data) obtained by predetermined integration is read from the AF area sensor 2 in accordance with a reading clock signal output from the control section 1, then subjected to A/D conversion executed by the AD converter 1d, and stored in the RAM 1c (step S66).

Subsequently, a main subject is extracted (step S67). A normal mode is set for the AF area sensor 2 (step S68). On the basis of a monitor signal indicating the position of the detected subject, integration control is executed (step S69). Then, usual sensor data (normal mode data) is read from the AF area sensor 2 (step S70). At this time, it is not necessary to read data from all pixels. It is sufficient if data is read only from pixels corresponding to the subject and its vicinities.

Thereafter, a distance-measuring area including the extracted subject is set, thereby executing distance calculation in the distance-measuring area (step S71) and driving the focusing lens on the basis of the calculation result (step S72).

FIG. 16 shows the relationship between the photography screen and the projection output obtained by the AF routine shown in FIG. 15. A description will be given of main subject detection using the projection output.

As aforementioned, the x-projection output is obtained by summing normal pixel outputs (normal sensor data) in the x-direction, while the y-projection output is obtained by summing normal pixel outputs in the y-direction. In the photography screen, the X-direction and the Y-direction correspond to the length-direction and the width-direction, respectively.

Where a background 52 is dark and a main subject 56 is bright as shown in FIG. 16, the projection output of the area in which the main subject 56 exists is higher than the other area.

In the aforementioned step S67, an area, which includes a region in which the X- and Y-directional output values exceed predetermined values Sx and Sy, respectively, is set as a distance-measuring area 54.

At the step S69, the control section 1 supplies the AF area sensor 2 with an instruction to set a monitor pixel area corresponding to the distance-measuring area 54.

Execution of an integration operation based on the monitor signal in the monitor area enables acquisition of optimum normal sensor data and execution of accurate distance calculation in the distance-measuring area 54 as the person judgment area. Further, in the case of a backlight scene, an area smaller than the main subject area is set as an integration control area 55, thereby executing integration control. This prevents sensor data in the person judgment area from being degraded by the influence of a very bright background.

Figure 17:
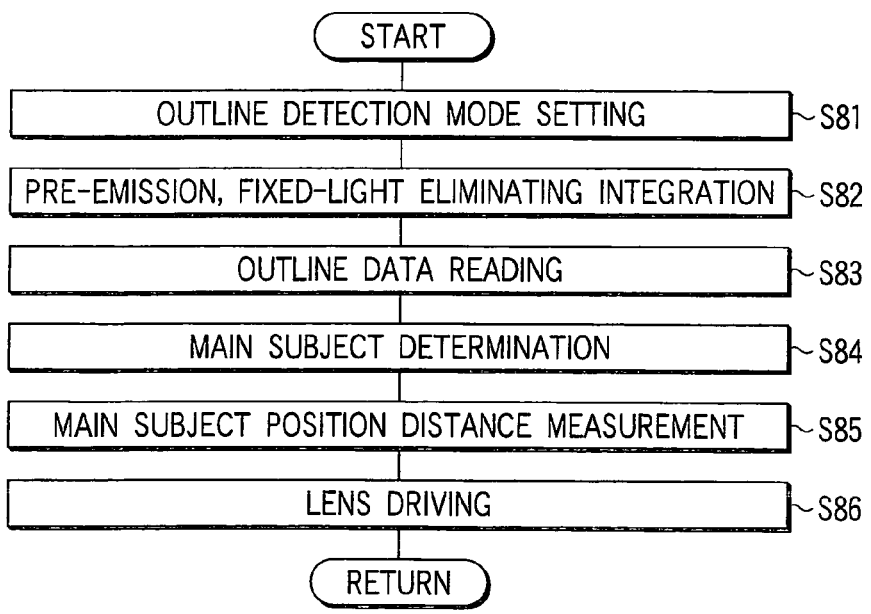
FIG. 17 is a flowchart useful in explaining a distance-measuring device according to a third embodiment of the invention.

Referring to the flowchart of FIG. 17, a distance-measuring device according to a third embodiment of the invention will be described.

Figures 8, 9:
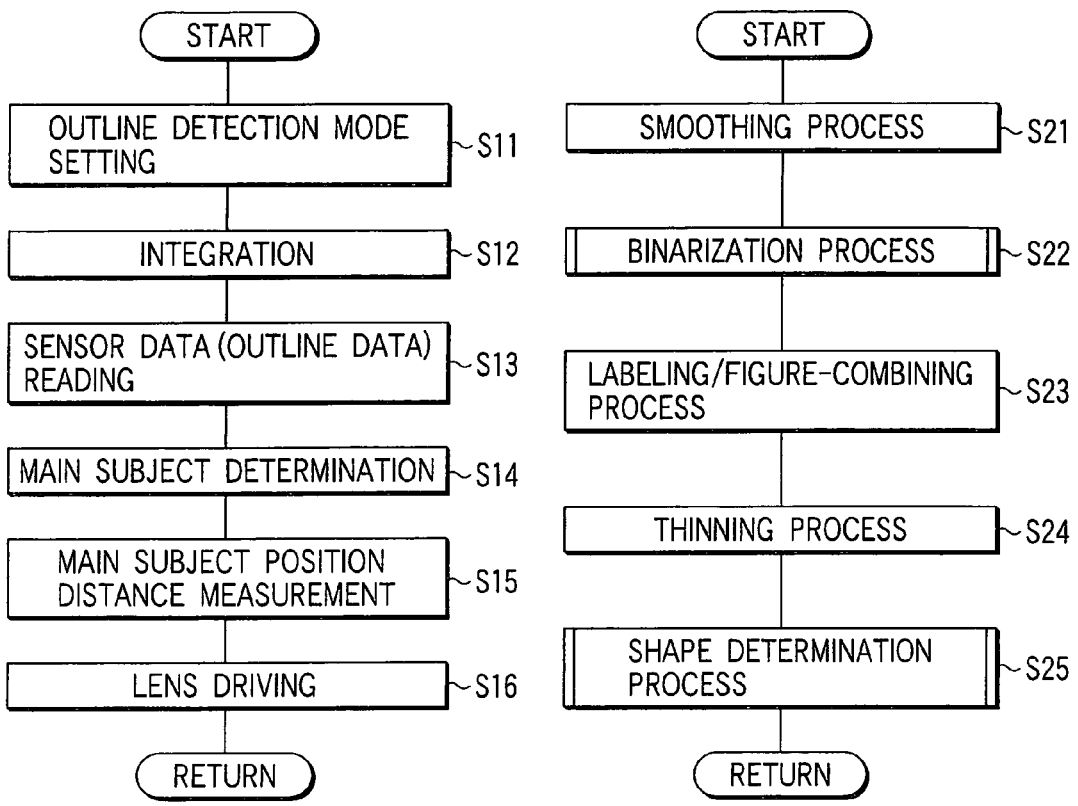
FIG. 8 is a flowchart useful in explaining an AF routine executed in the distance-measuring device of the first embodiment.
FIG. 9 is a flowchart useful in explaining a routine for detecting a main subject.

This embodiment has substantially the same structure as the first embodiment, and is characterized by a modification of the AF routine shown in FIG. 8. In the AF routine employed in this embodiment, outline detection of the background of an image other than a subject is prohibited.

First, an operation section incorporated in the camera is operated to set an outline detection mode for the AF area sensor 2 (step S81).

Subsequently, the control section 1 outputs an integration control signal to the AF area sensor 2, thereby executing pre-emission/fixed-light-eliminating-integration processing (step S82). This processing is done because if the AF routine shown in FIG. 8 is executed for a to-be-photographed scene as shown in FIG. 18, it is possible that outline detection will be also executed on a background portion other than the main subject 56, which inevitably increases the time lag.

To avoid the above, the AF area sensor 2 is made to execute the fixed-light-eliminating-integration processing while making the strobe unit 9 execute pre-emission several times. Since a larger amount of light is reflected from a subject when the subject is closer to the camera, an output corresponding to a subject located further from the camera can be removed if integration control is executed on a peak amount of reflected light while executing pre-emission. As a result, outline data as shown in FIG. 18B can be obtained.

After that, integrated sensor data (outline data) is read from the AF area sensor 2 in accordance with a reading clock signal output from the control section 1, then subjected to A/D conversion executed by the AD converter 1d, and stored in the RAM 1c.

Then, the central processing unit 1a executes processing for extracting a main subject (step S83). It is determined whether or not the extracted object is the main subject (step S84), thereby setting a distance-measuring area including the main subject and executing distance calculation (step S85). In this distance calculation, the influence of the background can be removed, and hence more accurate main subject detection and distance measurement with a small time lag can be realized.

Further, on the basis of distance measurement data obtained by the distance calculation, the focus lens driving section 3 drives the focus lens 4 (step S86).

Figure 18A:
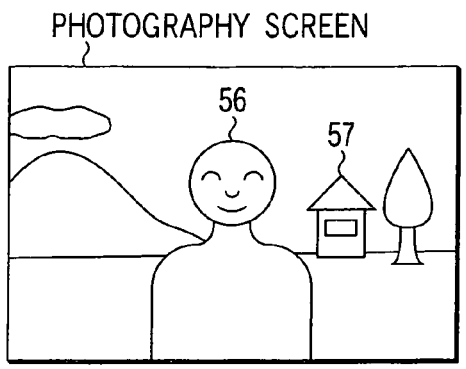
FIGS. 18A and 18B are views showing a to-be-photographed scene including a person, and outline data on the person.
Figure 18B:
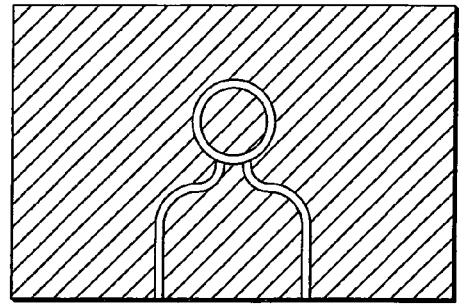

In this embodiment, even in a to-be-photographed scene as shown in FIG. 18A in which an object 57 that may erroneously be treated as a subject exists near a main subject 56, only the main subject can be subjected to outline detection processing, thereby preventing unnecessary processing from being executed to minimize the time lag. FIG. 18B shows outline data obtained by executing pre-emission and fixed-light-eliminating integration on the to-be-photographed scene shown in FIG. 18A.

Figure 19:
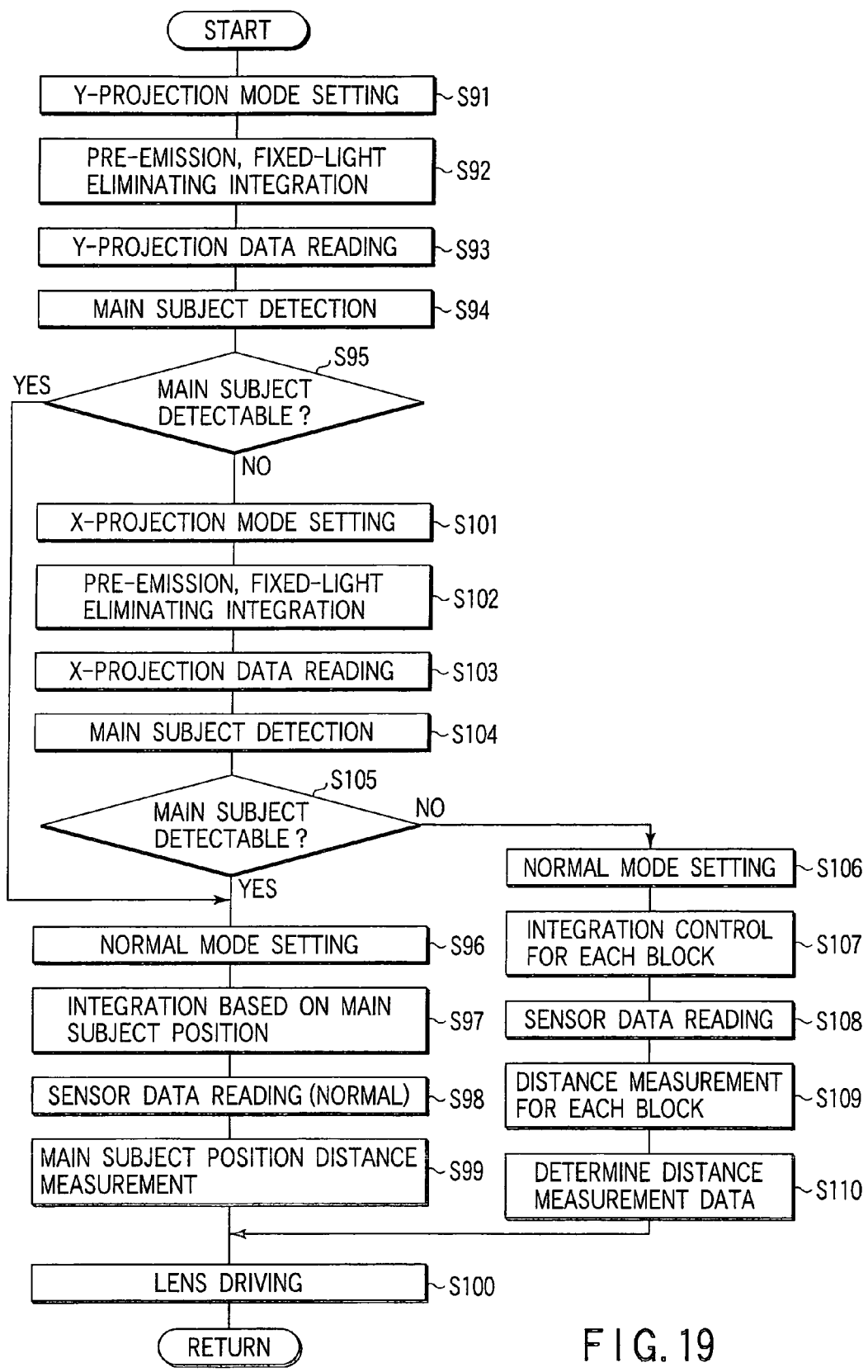
FIG. 19 is a flowchart useful in explaining a distance-measuring device according to a fourth embodiment of the invention.

Referring to the flowchart of FIG. 19, a distance-measuring device according to a fourth embodiment of the invention will be described. This embodiment has substantially the same structure as the second embodiment, and is characterized by a modification of the AF routine shown in FIG. 15. In the AF routine employed in this embodiment, projection detection of the background of an image, which has a high brightness, is prohibited.

First, an operation section incorporated in the camera is operated to set a y-projection detection mode for the AF area sensor 2 (step S91). Subsequently, the control section 1 outputs an integration control signal to the AF area sensor 2, thereby making the sensor 2 execute pre-emission/fixed-light-eliminating processing (step S92).

Figure 20:
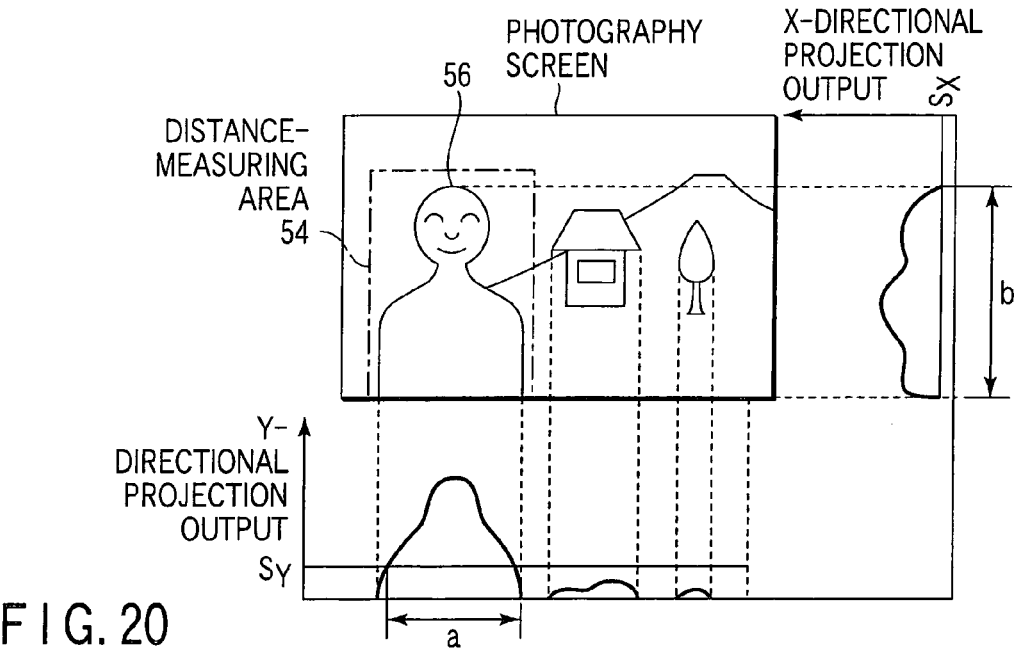
FIG. 20 is a view showing examples of x- and y-directional projections of a to-be-photographed scene.
Figure 21:
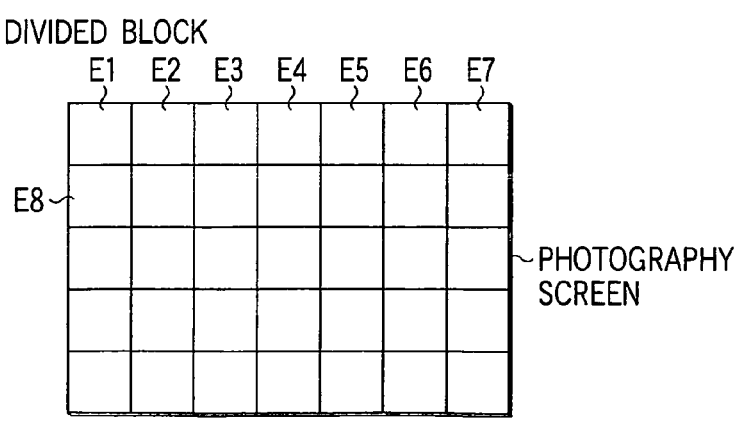
FIG. 21 is a view showing an example of a pixel area incorporated in an AF area sensor and corresponding to a to-be-photographed screen, the pixel area being divided into a plurality of blocks.

If the AF routine shown in FIG. 15 is applied to a to-be-photographed scene as shown in FIG. 20, it is possible that projection detection will be also executed on the background, other than the main subject 56, which has a high brightness, thereby preventing detection of the main subject and increasing the time lag due to the extra projection detection.

To avoid the above, the aforementioned pre-emission/fixed-light-eliminating processing is executed.

More specifically, the AF area sensor 2 is made to execute the fixed-light-eliminating-integration processing while making the strobe unit 9 execute pre-emission several times. Since a larger amount of light is reflected from a subject when the subject is closer to the camera, an output corresponding to a subject located further from the camera can be removed if integration control is executed on a peak amount of reflected light while executing pre-emission. As a result, Sy projection data (Sx projection data) as shown in FIG. 20 can be obtained, thereby removing the influence of the background and realizing more accurate distance measurement with a small time lag.

After that, sensor data (y-projection data) obtained by predetermined integration is read from the AF area sensor 2 in accordance with a reading clock signal output from the control section 1, then subjected to A/D conversion executed by the AD converter 1d, and stored in the RAM 1c (step S93).

Subsequently, main subject detection is executed (step S94), and it is determined whether or not a main subject has been detected (step S95). If it is determined that the main subject has been detected (i.e. the answer at the step S95 is YES), processing in the x-projection mode is omitted, and the normal mode is set for the AF area sensor 2 (step S96). This is because it is possible that the main subject will be detected only from y-projection data, since the background scene can be removed only on the basis of the y-projection data. If the main subject is detected only from the y-projection data, the next processing to be executed in the x-projection mode can be omitted, thereby reducing a time lag such as an integration period.

In this case, integration control based on a monitor signal corresponding to the position of the detected main subject is executed in the normal mode (step S97). Subsequently, normal sensor data (data obtained in the normal mode) is read from the AF area sensor 2 (step S98). At this time, it is not necessary to read data from all pixels. It is sufficient if data is read only from pixels corresponding to the subject and its vicinities.

Thereafter, a distance-measuring area 54 including the extracted subject is set, thereby executing distance calculation in the distance-measuring area (step S99) and driving the focusing lens on the basis of the calculation result (step S100).

If, on the other hand, any main subject is not detected at the step S95 (i.e. if the answer at the step S95 is NO), the x-projection mode is set for the AF area sensor 2 by a similar operation (step S101). Then, pre-emission/fixed-light-eliminating processing is executed (step S102).

Sensor data (x-projection data) obtained by predetermined integration is read from the AF area sensor 2 in accordance with a reading clock signal output from the control section 1, then subjected to A/D conversion executed by the AD converter 1d, and stored in the RAM 1c (step S103).

Thereafter, main subject detection is executed (step S104), and it is determined whether or not a main subject has been detected (step S105). If it is determined that the main subject has been detected (i.e. the answer at the step S105 is YES), which indicates that the main subject can be detected on the basis of both the y-projection data and the x-projection data, the program returns to the step S96. However, if any main subject is not detected (i.e. if the answer at the step S105 is NO), the AF area sensor 2 is set in the normal mode (step S106).

Subsequently, integration control is executed for each block (step S107). In this control, the pixel area of the AF area sensor 2 corresponding to the photography screen (or the light receiving area of the AF sensor corresponding to the photography screen) is divided into a plurality of blocks (E1, E2, . . . ), thereby executing integration control with reference to a monitor signal for each block.

After that, sensor data is read from the AF area sensor 2 under the control of the control section 1 (step S108), and distance calculation is sequentially executed for each block (step S109), thereby determining appropriate distance measurement data from distance measurement data obtained from all blocks (step S110). The appropriate distance measurement data is data indicating a shortest distance. Thus, when the main subject cannot be detected from both the x- and y-projection data, distance measurement is executed on the entire screen, thereby creating distance measurement data based on a predetermined algorithm (shortest distance selection, average value calculation, etc.).

Then, the program returns to the step S100, where the focusing lens is driven on the basis of the determined distance measurement data.

In this embodiment, even in a to-be-photographed scene as shown in FIG. 20 in which an object that may erroneously be treated as a subject exists other than a main subject, only the main subject can be subjected to projection detection processing, thereby preventing unnecessary processing from being executed to minimize the time lag.

Referring to the flowchart of FIG. 22, a distance-measuring device according to a fifth embodiment of the invention will be described.

First, an operation section incorporated in the camera is operated to set a low resolution mode for the AF area sensor 2 (step S111). Then, integration control is executed by the control section 1 (step S112).

After that, sensor data (low resolution data) obtained by predetermined integration is read from the AF area sensor 2 in accordance with a reading clock signal output from the control section 1, then subjected to A/D conversion executed by the AD converter 1d, and stored in the RAM 1c (step S113). The stored sensor data is low resolution data as shown in FIG. 14C obtained from a to-be-photographed scene as shown in FIG. 14A.

Subsequently, main subject detection is executed on the basis of the low resolution data (step S114).

Then, a high resolution mode (normal mode) is set for the AF area sensor 2 (step S115). Integration control is executed on the basis of a monitor signal indicating the position of the detected main subject (step S116). Sensor data (high resolution data) is read from the AF area sensor 2 (step S117).

After that, a distance-measuring area including the detected main subject is set, thereby executing distance calculation in the distance-measuring area (step S118). On the basis of the calculation result, the focusing lens is driven (step S119).

Figure 23:
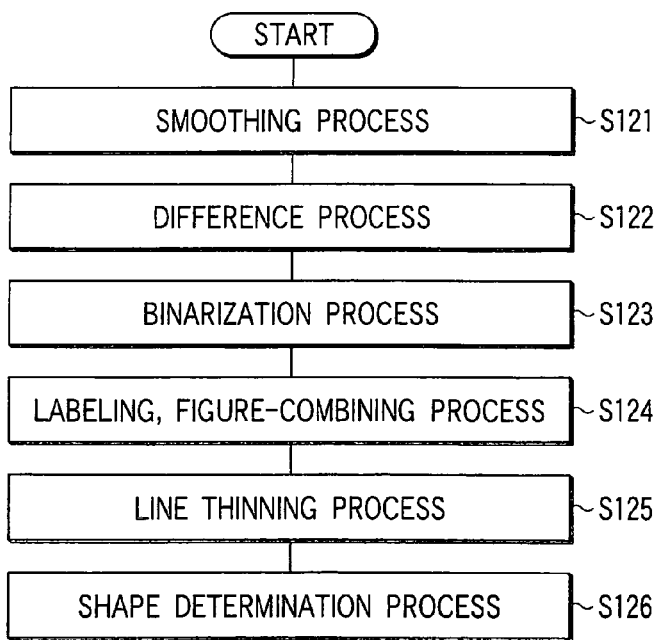
FIG. 23 is a flowchart useful in explaining the manner of detecting a main subject in the fifth embodiment of the invention.

Referring now to the flowchart of FIG. 23, main subject detection executed at the step S114 will be described.

The main subject detection is executed by substantially the same routine as shown in FIG. 9, except for that low resolution sensor data is subjected to difference processing.

The sensor data output from the AF area sensor 2 for main subject detection is stored in the RAM 1c of the control section 1, and the following processing is executed on the basis of this sensor data.

The read sensor data is subjected to smoothing processing (step S121). This smoothing processing is a process for eliminating random noise contained in an image by filtering processing or Fourier transform.

The obtained low resolution data is subjected to difference processing (step S123). This difference processing is a process for executing edge detection, thereby providing edge candidate areas and their intensities.

In this edge detection, sensor data s(i,j) as shown in FIG. 24 is subjected to the following processing:

In the case of a method using a first-degree differential operator, x- and y-directional differential values are given by the following equations:

$$\Delta xs(i,j)=s(i,j)-s(i-1,j)$$

$$\Delta ys(i,j)=s(i,j)-s(i,j-1)$$

As a result, data as shown in FIG. 25A is obtained.

Further, in the case of a method using a second-degree differential operator, x- and y-directional differential values are given by the following equations:

$$\Delta^2 xs(i,j)=s(i-1,j)-2s(i,j)-s(i+1,j)$$

$$\Delta^2 ys(i,j)=s(i-1,j)-2s(i,j)-s(i,j+1)$$

The Laplacian operator as a kind of second-degree differential operator emphasizes an edge, and hence data at the portion is shifted from a positive value to a negative value. In light of this, an edge can be obtained by extracting a portion "0".

More specifically, sum of products using a space filter table (weight table) is calculated. FIGS. 26A-26D show examples of space filter tables. FIGS. 26A and 26B show first-degree differential operators (in the row and column directions), FIG. 26C the Laplacian operator, and FIG. 26D the Sobel operator (for executing x- and y-directional first-degree differential, absolute value transformation, addition).

The following calculation formula is used:

$$s'(x,y) = \frac{1}{n} \sum_{i=-1,j=-1}^{1,1} s(x+i, y+j) \cdot w(i,j) \quad (1)$$

where S(x,y) represents data before processing, S'(x,y) data after processing, W(x,y) a space filter, and n a constant.

The aforementioned space filters are selectively used in accordance with the circumstances. When difference processing is executed on an image that occupies the entire photography screen, the first-degree differential operator or the Laplacian operator is used since calculation using the operator is relatively easy and executed at high speed.

On the other hand, when difference processing is executed on an image that occupies only part of the photography screen, the Sobel operation is used, since calculation using this operator is very effective in this case although it is relatively complicated and hence requires a long calculation period.

Furthermore, in order to reduce the AF time lag, the operators may be switched such that the first-degree differential operator or the Laplacian operator is used when processing an image that has a low brightness and requires a long integration period of the AF area sensor 2, while the Sobel operator is used when processing an image that has a high brightness and requires only a short integration period.

As described above, in the case of low resolution data, outline detection is executed using difference processing.

Thereafter, the image obtained after difference processing is subjected to processing based on a predetermined threshold level, as at the step S22 of FIG. 9, thereby extracting a portion of the image which has a level lower than the predetermined threshold level, to obtain a binary image (step S123).

After that, the central processing unit 1a executes labeling and figure combining processing on the binary image (step S124), thereby obtaining a figure having a certain width corresponding to an edge obtained by line thinning processing (step S125). The line width of this figure is reduced to about 1, using line thinning algorithm.

Subsequently, the shape of the image is determined by shape determination processing, described later, thereby extracting the main subject (step S126).

Since low resolution data can be obtained at high speed by using the low resolution mode, higher processing can be realized than in the case of using calculation processing such as addition.

Further, since the main subject detection is executed by reducing the number of data items, i.e. using low resolution data, higher main subject detection processing is realized. In addition, distance calculation is executed on the basis of high resolution data, thereby enabling accurate distance measurement.

Figure 27:
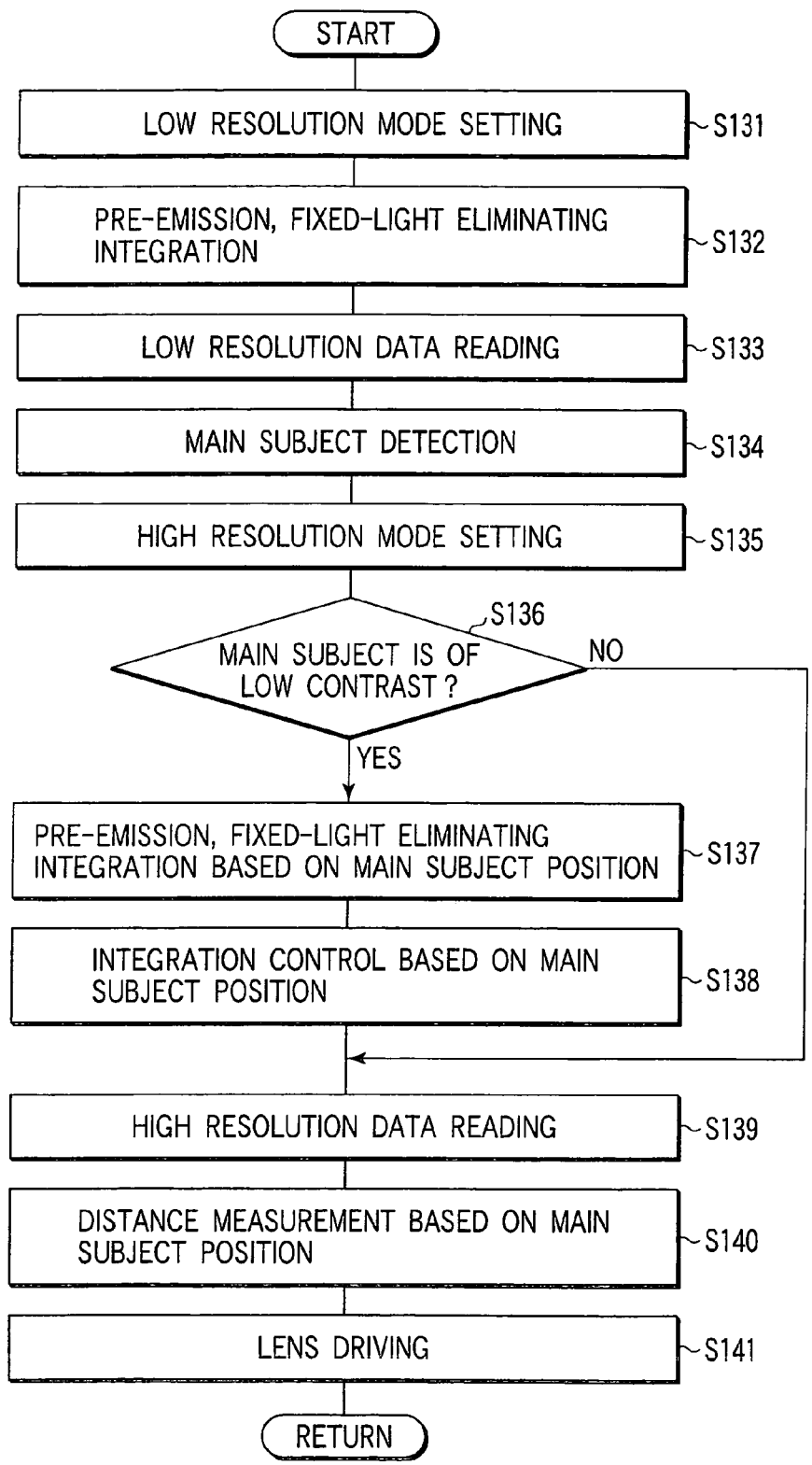
FIG. 27 is a flowchart useful in explaining the manner of detecting a main subject in a sixth embodiment of the invention.

Referring to the flowchart of FIG. 27, a distance-measuring device according to a sixth embodiment of the invention will be described.

Figure 22:
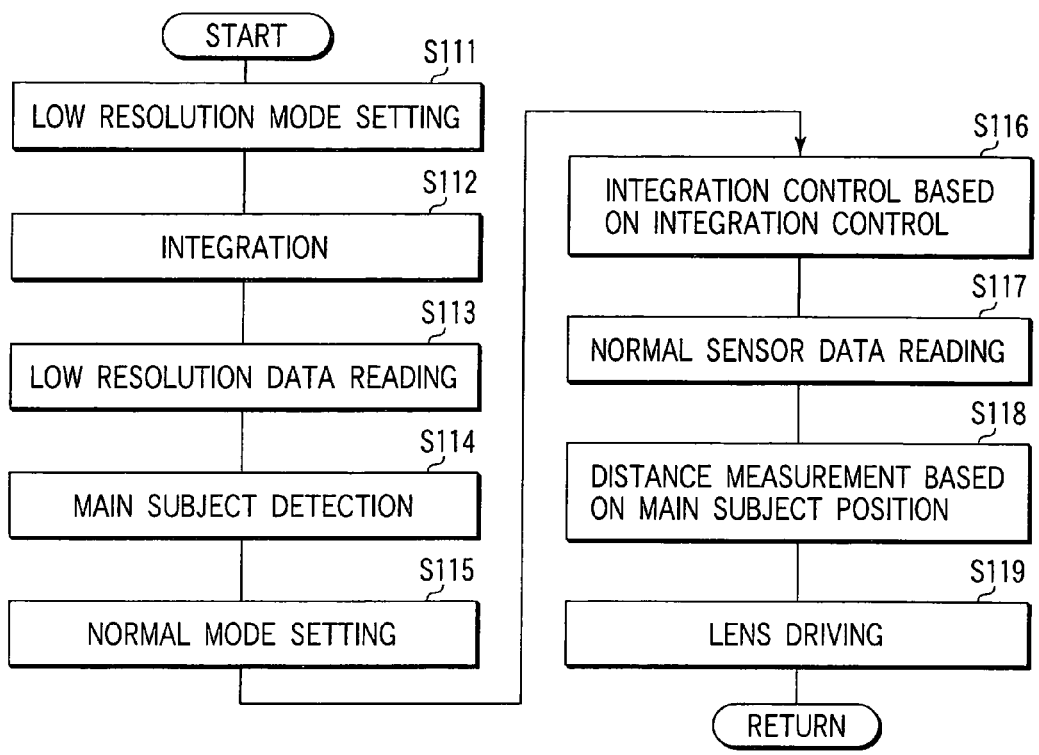
FIG. 22 is a flowchart useful in explaining a distance-measuring device according to a fifth embodiment of the invention.

In this embodiment, usual integration executed in the case shown in FIG. 22 is replaced with pre-emission/fixed-light-eliminating integration. Since in this case, even in the low resolution mode, an integration operation is executed while fixed light is eliminated using pre-emission of the strobe unit 9, the influence of the background at a long distance can be eliminated, thereby enabling accurate main subject detection.

First, an operation section incorporated in the camera is operated to set a low resolution mode for the AF area sensor 2 (step S131). Then, pre-emission/fixed-light-eliminating integration control is executed, in which the AF area sensor executes an integration operation under the control of the control section 1, while the strobe unit 9 executes pre-emission to eliminate fixed light under the control of the control section 1 (step S132).

After that, sensor data (low resolution data) obtained by predetermined integration is read from the AF area sensor 2 in accordance with a reading clock signal output from the control section 1, then subjected to A/D conversion executed by the AD converter 1d, and stored in the RAM 1c (step S133).

Subsequently, main subject detection is executed on the basis of the low resolution data (step S134). When executing distance measurement, a high resolution mode is set for the AF area sensor 2 (step S135). Then, it is determined whether or not the detected main subject has a low contrast (step S136). If it is determined that the detected main subject does not have a low contrast (i.e. the answer at the step S136 is YES), a fixed-light-eliminating integration operation is executed on the basis of the position of the main subject, while controlling the strobe unit 9 so as to execute pre-emission (step S137).

After that, usual integration control is executed on the basis of a monitor signal indicating the position of the detected main subject (step S138), thereby reading sensor data (high resolution data) from the AF area sensor 2 (step S139). If, on the other hand, it is determined at the step S136 that the main subject has a low contrast (i.e. if the answer at the step S136 is NO), the program directly proceeds to the step S139.

Thereafter, a distance-measuring area including the detected main subject is set, thereby executing distance calculation in the distance-measuring area (step S140). On the basis of the calculation result, the focusing lens is driven (step S141).

Since in this embodiment, the condition of the main subject is determined by main subject detection processing, and the integration mode is changed (between usual integration and pre-emission/fixed-light-eliminating integration), an integration operation suitable for a main subject can be executed, and hence the accuracy of detection is enhanced.

Figure 28:
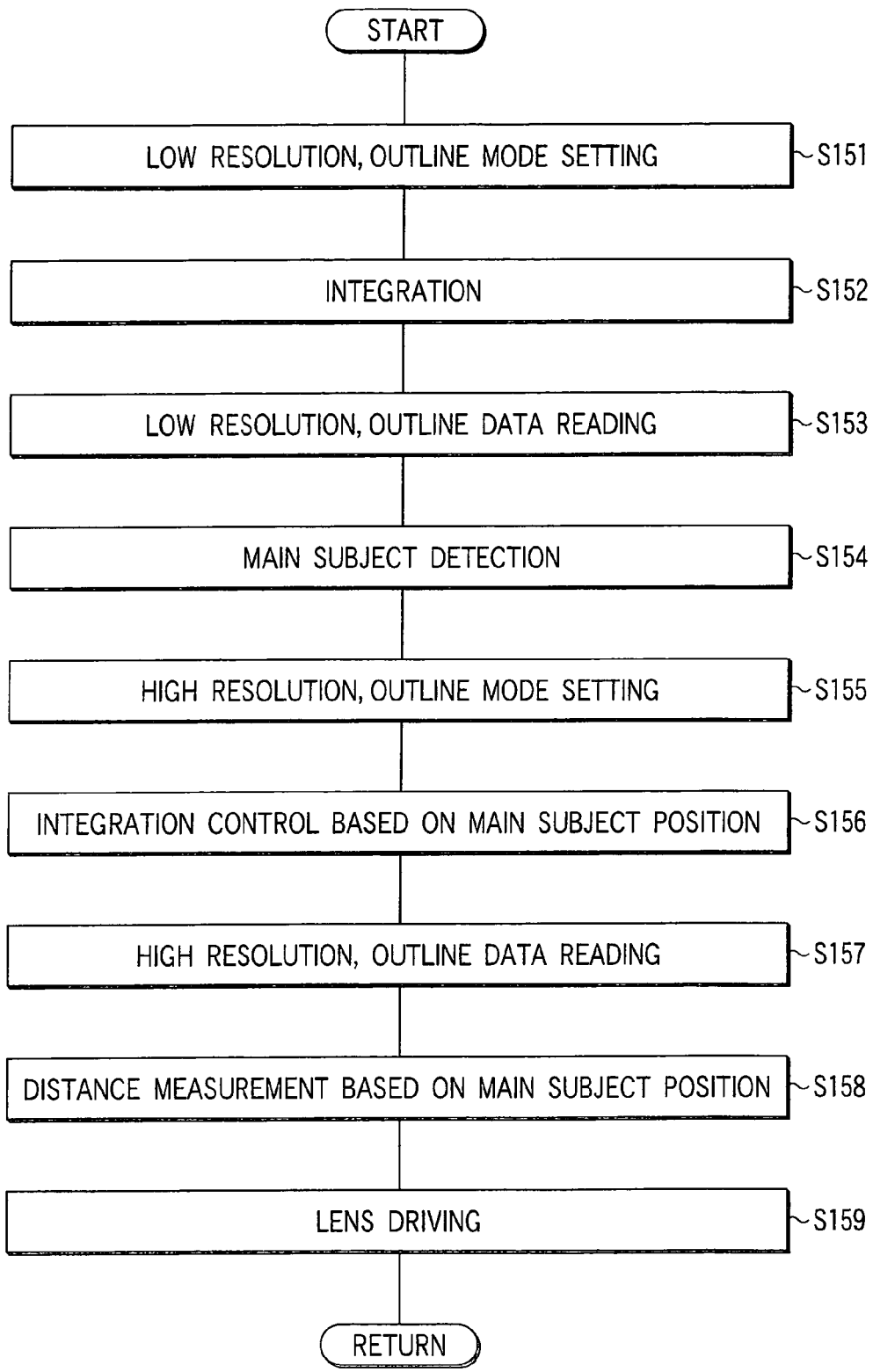
FIG. 28 is a flowchart useful in explaining the manner of detecting a main subject in a seventh embodiment of the invention.

Referring to the flowchart of FIG. 28, a distance-measuring device according to a seventh embodiment of the invention will be described.

In this embodiment, the AF area sensor 2 is set in a low-resolution/outline mode, and main subject detection is executed on the basis of obtained low-resolution/outline data.

First, an operation section incorporated in the camera is operated to set a low-resolution/outline detection mode for the AF area sensor 2 (step S151). Subsequently, the control section 1 outputs an integration control signal to the AF area sensor 2, thereby making the sensor 2 execute integration processing (step S152).

After that, sensor data (low-resolution/outline data) obtained by predetermined integration is read from the AF area sensor 2 in accordance with a reading clock signal output from the control section 1, then subjected to A/D conversion executed by the AD converter 1d, and stored in the RAM 1c (step S153). The stored sensor data is low resolution data as shown in FIG. 14C obtained from a to-be-photographed scene as shown in FIG. 14A.

Subsequently, main subject detection is executed on the basis of the low-resolution/outline data (step S154). During distance measurement, a high-resolution/outline mode is set for the AF area sensor 2 (step S155).

Integration control is executed on the basis of the position of the detected main subject (step S156). Sensor data (high resolution data) is read from the AF area sensor 2 (step S157).

Thereafter, a distance-measuring area including the detected main subject is set, thereby executing distance calculation in the distance-measuring area (step S158). On the basis of the calculation result, the focusing lens is driven (step S159).

Since low resolution data can be obtained at high speed by using the low resolution mode, higher processing can be realized than in the case of low resolution data acquisition using calculation processing such as addition. Further, since the main subject detection is executed by reducing the number of data items, i.e. using low resolution data, higher main subject detection processing is realized.

In addition, since outline data can be obtained at high speed by using the outline mode, higher processing can be realized than in the case of outline data acquisition using calculation processing such as addition. Further, since the main subject detection is executed on the basis of the acquired outline data, higher main subject detection processing is realized. Distance calculation is executed on the basis of high resolution data, thereby enabling accurate distance measurement.

A distance-measuring device according to an eighth embodiment of the invention will be described.

In the eighth embodiment et seq., which will be described now and later, the sensor section of the distance-measuring device is formed of a line sensor consisting of pixels (sensors) as photoelectric elements that are arranged in line, or an area sensor consisting of pixels (sensors) that are arranged in two-dimensions, for example, in a matrix. Further, any one of the line sensor and the area sensor is referred to as a sensor array.

FIGS. 29 and 30A-30C are views useful in explaining the principle of triangular distance measurement, like FIG. 3B. When sensor arrays 62a and 62b have detected an image of a subject 64 at high accuracy via two light receiving lenses 63a and 63b separated from each other by a base length B, the parallax between the lenses causes a positional difference x of the image as a result of a similar effect to the eyes of a person. A distance L to the subject is obtained by the equation L=B·f/x.

Since the image position is determined by comparing two images output from the two sensor arrays 62a and 62b, it is necessary to detect images using very high resolution. Further, f represents the focal distance of each light receiving lens.

A computing control section (CPU) 61 calculates the relative positional difference x of the subject images on the basis of the outputs of the two line sensors, thereby calculating the distance L to the subject using the aforementioned equation, and controlling a focusing section 65 so as to focus the camera on the subject. This processing realizes a so-called auto-focusing (AF) camera.

Figure 31A:
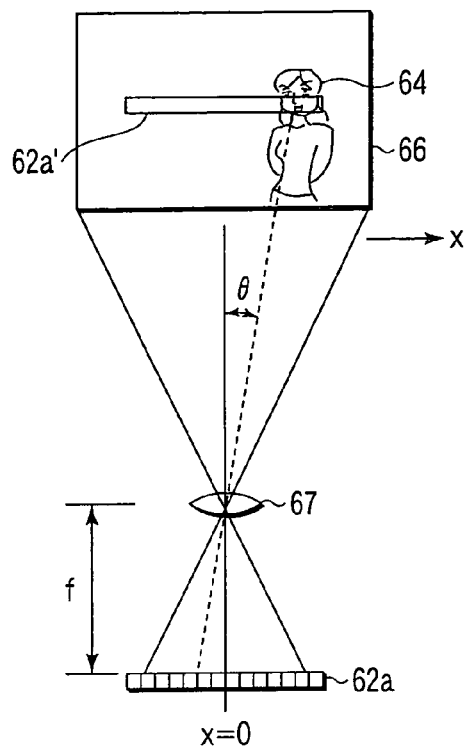
FIGS. 31A, 31B, 31C and 31D are views illustrating the relationship between a line sensor output and a subject.

Furthermore, when the subject 64 is not situated on a central portion of a screen 66 corresponding to a photography lens 67, but deviated by an angle θ in the x-direction as shown in FIG. 31A, it is sufficient if the position of that one of the sensor arrays 62a, which is used as a reference sensor, is shifted by $x_0$.

From the relationship θ=arctan ($x_0$/f), a distance to the subject displaced by θ can be measured. Thus, the distance measurement enabled position can be widened in the x-direction by shifting the line sensor. After that, it is sufficient if it is determined by pattern detection at which position of the sensor distance measurement should be chiefly executed.

A description will be given of a case where line sensors are used for pattern detection for detecting a characterizing point of an object in the eighth embodiment.

Figure 29:
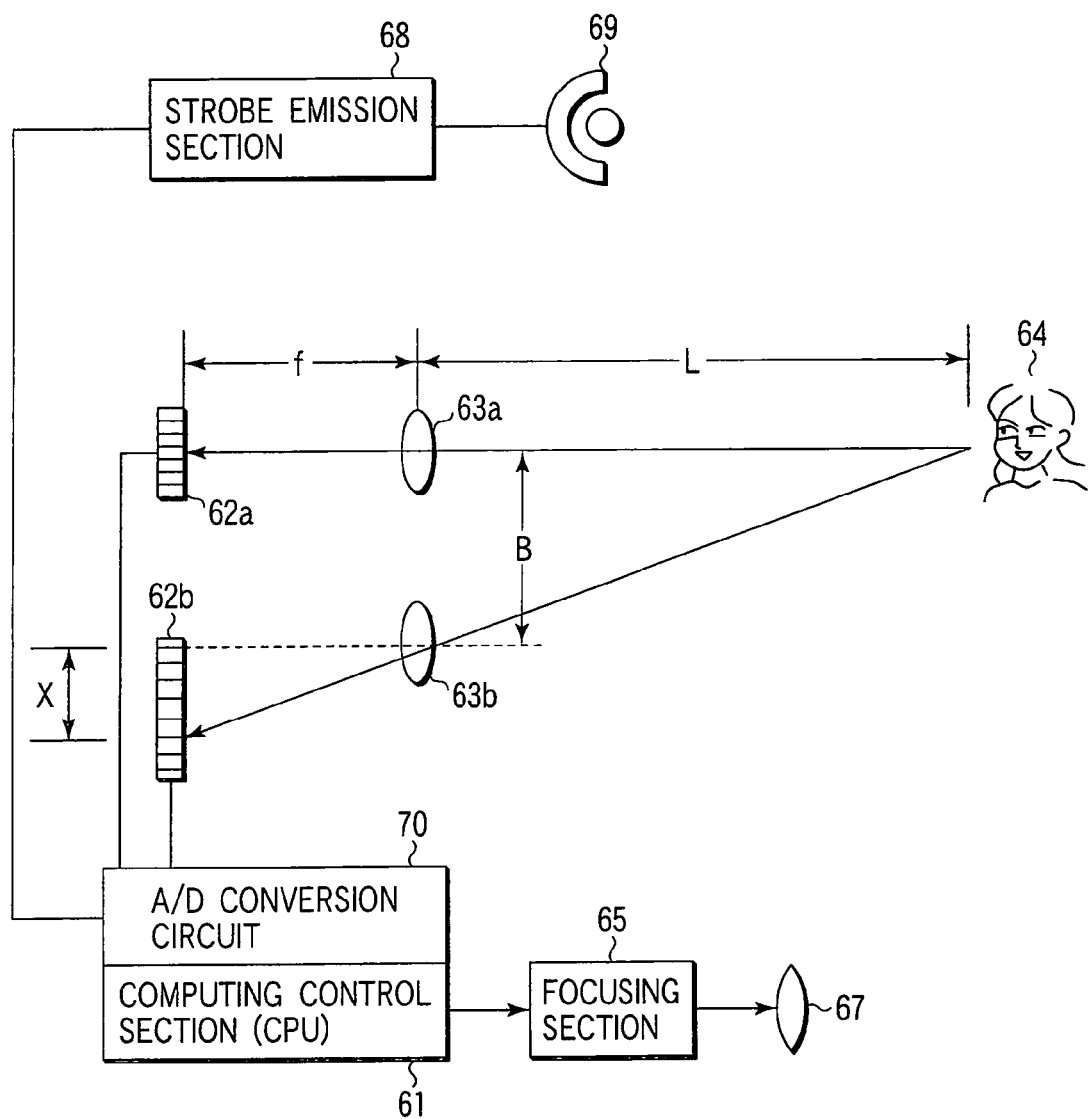
FIG. 29 is a flowchart useful in explaining a distance-measuring device, using the principle of triangular distance measurement, according to an eighth embodiment of the invention.

When the CPU 61 has excited a xenon tube 69 incorporated in a strobe unit 68 as shown in FIG. 29, a light signal reflected from the subject or person 64 enters the sensor array 62a via the light receiving lens 63a. From a distribution of light output from the sensor array 62a, the distance to the main subject 64 can be detected.

Figure 31B:
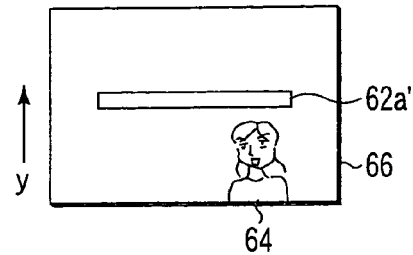
Figure 31C:
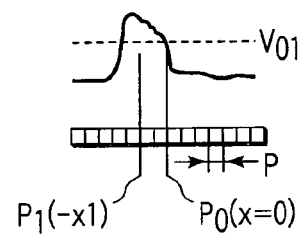

More specifically, as shown in FIG. 31C, reflected light is distributed on the sensor array 62a, and the position $x_1$ of the reflected light is detected, thereby detecting the position of the person as an angle θ with respect to the center of the screen.

For example, supposing that the pitch of each pixel of the sensor array is P, the $P_0$-th pixel corresponds to the center of the screen, and the center of the reflected light exists on the $P_1$-th pixel, it is considered that the subject is situated in a position $(-x_1)$ (x=$(P_1-P_0)$/P), i.e., in terms of θ, in a position θ=arctan (-x/f). Accordingly, it is sufficient if distance measurement is chiefly executed in this position.

However, to obtain only $(-x_1)$, not so accurate detection of a distribution of the reflected light (image detection) as executed for the above-described distance measurement is necessary.

Figure 31D:
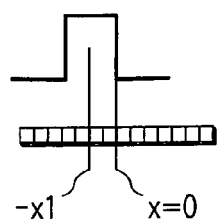

Therefore, it is sufficient if it is determined whether or not the amount of light is more than a voltage $V_{01}$ as shown in FIG. 31C, and binarized light amount determination as shown in FIG. 31D is executed. In a method for sequentially comparing the sensor output with various voltages obtained by dividing a reference voltage as shown in FIG. 30B, thereby executing A/D conversion, the to-be-compared voltage $V_{comp}$ can be fixed at $V_{01}$, and hence the position of the main subject can be determined at high speed.

FIG. 30C is a flowchart useful in explaining focusing processing.

First, before distance measurement, a rough pitch line sensor output is obtained and subjected to A/D conversion, thereby determining a pattern (step S161). Subsequently, a distance-measuring point is determined (step S162), and then a fine pitch line sensor output is obtained and subjected to A/D conversion, thereby calculating a distance (step S163). Since A/D conversion is thus executed on image of different resolutions, focusing processing can be executed at high speed.

A description will be given of a ninth embodiment where area sensors are used for pattern detection for detecting a characterizing point of an object.

In the above-described eighth embodiment, high speed focusing cannot be executed on, for example, a scene in which an object (person) 64 as a main subject is not situated in a central position as shown in FIG. 31B. To overcome this, the ninth embodiment employs area sensors instead of the line sensors for executing high speed processing on such a scene.

Figure 32A:
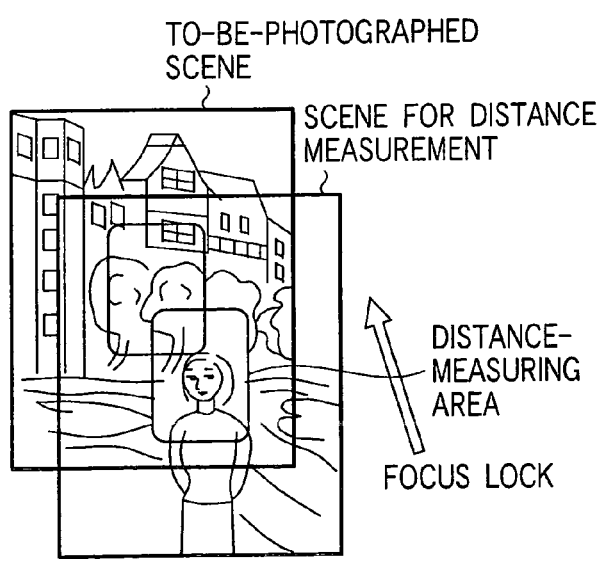
FIGS. 32A and 32B are views illustrating the relationship between a distance-measuring area and a to-be-photographed scene.
Figure 32B:
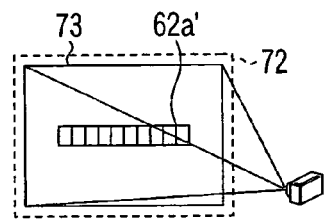

As shown in FIG. 32B, the distance-measuring area of 62a of a line sensor is a central slim area in the photography screen 72 of the camera. On the other hand, an area sensor is identical to a structure in which line sensors are arranged in two-dimensions, and accordingly the distance-measuring area can be widened to an area 73 substantially the same as the photography screen 72.

When picking up a scene as shown in FIG. 32A in the prior art, two-step exposure, a so-called focus lock operation, is executed. Specifically, at first, a main subject is contained in a distance-measuring area (a central portion of the screen), and a release button is half-pushed to execute distance measurement. After that, the camera is shifted to a position in which a to-be-photographed scene can be contained in the screen, with the release button half-pushed, thereby further pushing the release button to execute exposure.

This operation, however, requires time and effort for a pre-operation before image pick up, and may loose good timing for photography in the case of picking up a moving subject. If an area sensor is used to widen a distance-measurement-enabled area, a distance to a main subject situated even in an end portion of the photography screen as shown in FIG. 32A can be measured.

However, even if the technique for measuring a distance to an object situated in an end portion of the photography screen is used, a technique for detecting where in the photography screen the main subject exists becomes important since the number of distance-measurement-enabled points increases.

Where the number of distance-measuring points is extremely increased, sequential execution of distance measurement for the distance-measuring points requires much more time than in the case of the focus lock operation. This is very disadvantageous especially because the area sensor is more expensive than the line sensor.

Referring then to FIG. 33, a description will be given of the concept of the distance-measuring device, according to the ninth embodiment, for detecting the position of a main subject at high speed.

First, as shown in FIG. 33A, emission is executed at a wide angle corresponding to the photography screen before distance measurement. FIG. 33B shows a pattern equivalent to that distribution, on an area sensor, of light reflected from a to-be-photographed scene, which is based on differences of distance to the scene.

Almost no reflected-light signal is returned from a complicated background since it is located at a long distance from the camera. On the other hand, reflected-light signals are returned from a person and flowers located at a short distance from the camera. Accordingly, the pattern formed on the area sensor is very simple as shown in FIG. 33B.

It can be determined in which position on the photography screen the main subject exists, by causing the computing control section of the camera to compute the binarized pattern signal on the basis of a predetermined sequence of pattern determination processing.

This is similar to that described with reference to FIGS. 29-31D. If distance measurement is executed at a distance-measuring point based on the determined position as shown in FIG. 33C, an auto-focusing (AF) technique for instantly focusing the camera on a main subject is realized, irrespective of on which portion of the photography screen the main subject exists.

At this time, the distance measurement method may be switched, depending upon the situation, between the so-called active type method for emitting light dedicated to distance measurement, and the passive type method for executing distance measurement without light dedicated to distance measurement.

FIG. 34A is a view useful in explaining the concept of the ninth embodiment. More specifically, FIG. 34A shows an example of a structure for executing distance measurement by detecting the position of a subject 81 using pre-emission.

In this case, at first, auxiliary light is projected from a strobe unit 84 onto the subject 81 under the control of a light projection control circuit 83. Light reflected from the subject enters two light receiving lenses 85a and 85b and then two area sensors 86a and 86b.

The area sensors 86a and 86b receive light indicating a subject and subject it to photoelectric conversion. The outputs of these sensors are subjected to A/D conversion in an A/D converter circuit 87, and the digital value of each pixel is input to a computing control section (CPU) 88.

The area sensors 86a and 86b are connected to a fixed-light eliminating circuit 90, where a DC light signal that constantly enters the sensors through the photography screen is eliminated under the control of the computing control section 88, thereby outputting only a signal indicating pulse light (auxiliary light) from the strobe unit 84.

Accordingly, when the area sensors 86a and 86b receive a reflected-light signal while the fixed-light eliminating circuit 90 is operated, they form, on their respective light receiving surfaces, an image coated in black as shown in FIG. 34B. The pattern of the image formed on the sensor sensors is analyzed by a pattern determining section (e.g. formed of software) incorporated in the computing control section 88. If the image pattern is determined to indicate a person, the pattern can be considered to be a main subject.

Referring to the flowchart of FIG. 35, distance measurement executed by the distance-measuring device of the ninth embodiment will be described.

First, before executing distance measurement, the projection control circuit 83 incorporated in a projection section 82 controls the strobe unit 84 so as to execute pre-emission, thereby projecting auxiliary light onto the subject 81 and causing light reflected from the subject to enter the area sensors 86a and 86b. At this time, the fixed-light eliminating circuit 90 is operated to eliminate fixed light from the reflected-light signal entering the area sensors 86a and 86b, thereby extracting only an image signal from the reflected-light signal (step S171).

Subsequently, the A/D converter circuit 87 subjects the extracted image signal to A/D conversion, and the A/D converted image signal is input to the computing control section 88, where the image pattern formed on the area sensors 86a and 86b is analyzed using predetermined software (step S172).

It is determined whether or not the analyzed image pattern indicates, for example, a person and can be considered to be a main subject (step S173). A description will now be given of how the detected pattern is determined to indicate a person.

Figure 36A:
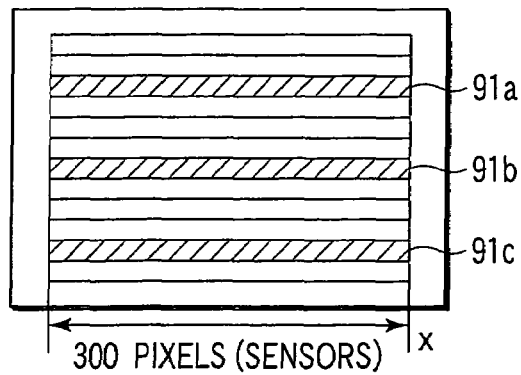
FIGS. 36A, 36B, 36C and 36D are views illustrating the relationship between sensor strings incorporated in an area sensor and a photography screen.
Figure 36B:
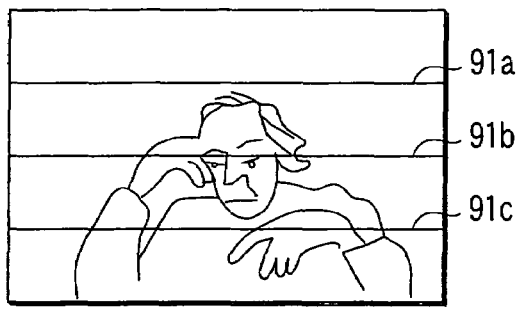
Figure 36C:
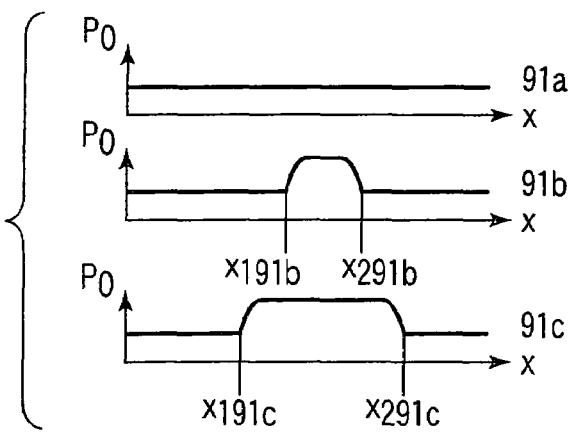

As shown in FIG. 36A, each area sensor 86a or 86b is formed of line sensors arranged in rows in the photography screen. For facilitating the explanation of pattern determination, only line sensors of three rows 91a, 91b and 91c are selected. In the case of a scene as shown in FIG. 36B, no portion of the person exists in a position corresponding to the line sensor 91a, while the face and the body of the person are situated in positions corresponding to the line sensors 91b and 91c, respectively. Accordingly, output results as shown in FIG. 36C are obtained corresponding to the respective line sensors.

In this embodiment, on the basis of a ⊓-shaped distribution of reflected-light intensity at each row, it is determined whether or not the subject is a person.

Figure 37:
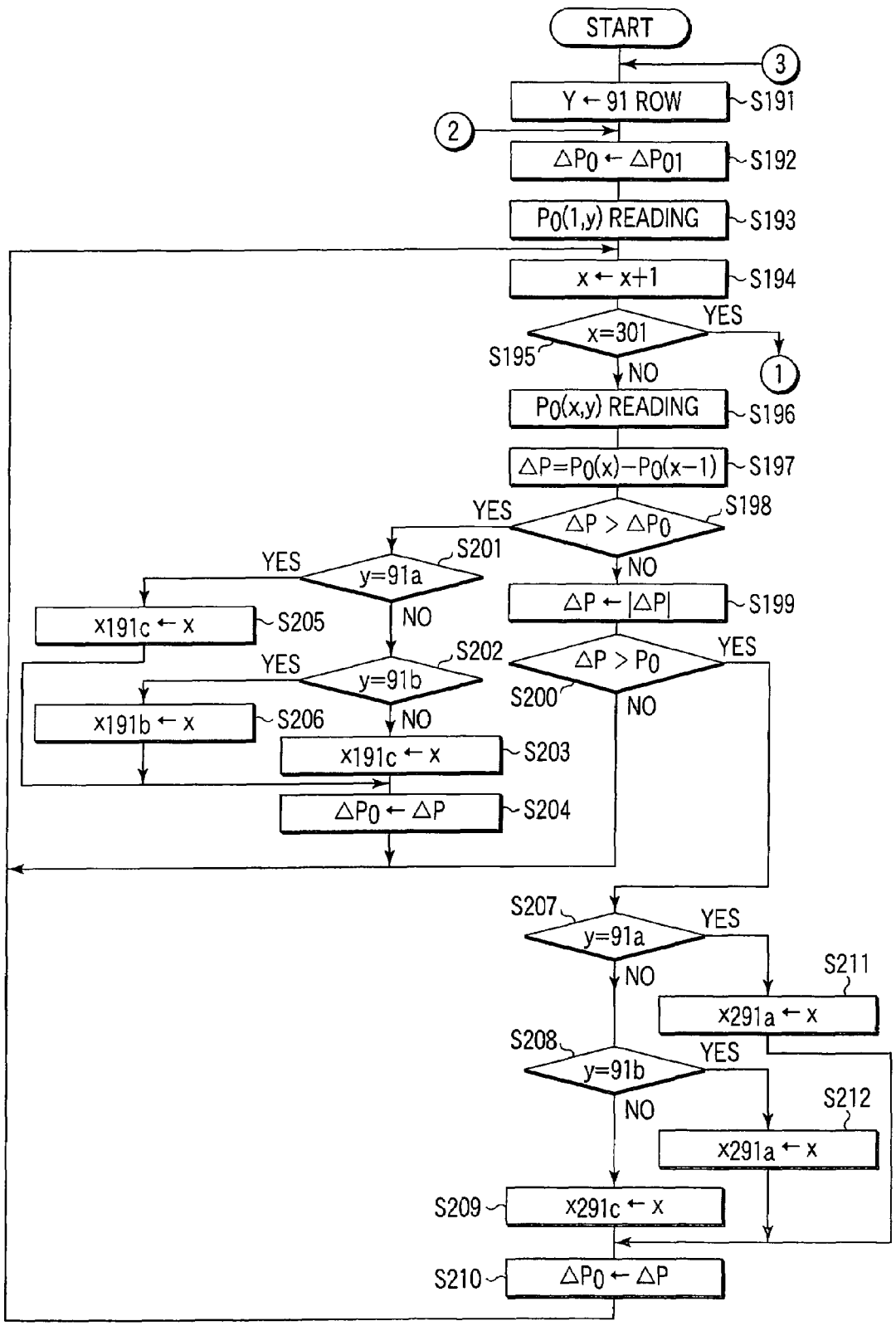
FIG. 37 is first part of a flowchart useful in explaining subject pattern determination.
Figure 38:
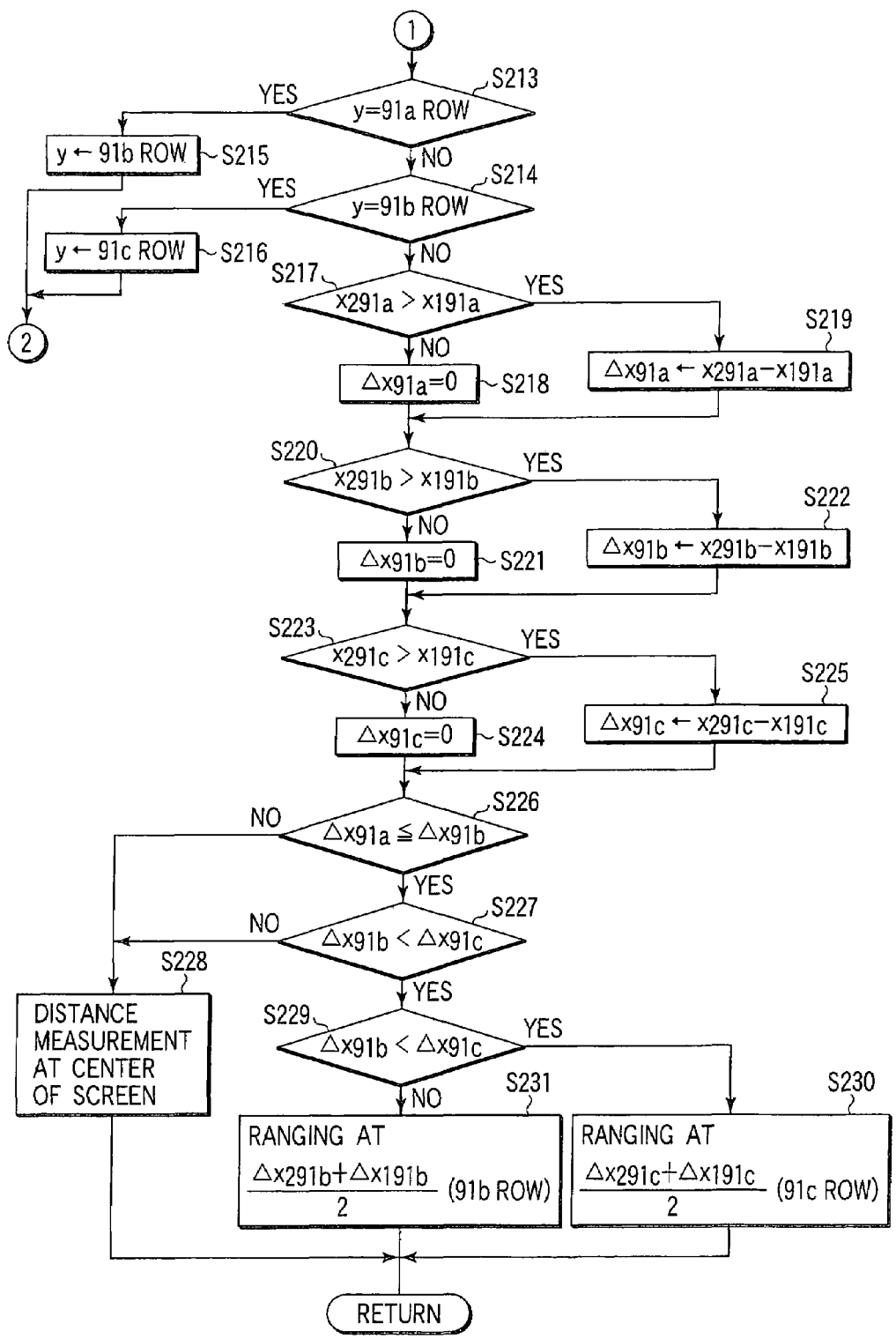
FIG. 38 is second part of the flowchart useful in explaining the subject pattern determination.

Referring to the flowchart of FIGS. 37 and 38, this pattern determination will be described.

First, it is designated to execute pattern determination along the row 91a (step S191). After finishing processing along the row 91a, the program proceeds to steps S215 and S216, described later, where similar processing is executed along the rows 91b and 91c.

Subsequently, a change $\Delta P_0$ for ⊓determination is set at a predetermined change $\Delta P_{01}$, and the ⊓-shaped distribution is detected depending upon whether or not the change $\Delta P_{01}$ causes a great change (step S192). Then, the CPU 88 shown in FIG. 34 reads the output of a pixel with coordinates (1, y) of each area sensor 86a or 86b, i.e. a first pixel at the row 91a (step S193). Since 300 pixels (photoelectric elements for distance measurement) are arranged in the x-direction of each sensor 86a or 86b, the value x is incremented sequentially (step S194). Until the value x reaches 300, the processing at a step S196 et seq. is repeated (step S195). Before the value x reaches 300, the sensor output is read by the CPU 88 each time the value x is incremented by 1 (step S196), thereby calculating $\Delta P$ from the following equation:

$$\Delta P = P_0(X) - P_0(x-1)$$

Subsequently, the resultant $\Delta P$ is compared with the value $\Delta P_0$ of a pixel adjacent to the first-mentioned one (step S198). If $\Delta P \leq \Delta P_0$ (if the answer is NO), the absolute value $|\Delta P|$ of $\Delta P$ is calculated (step S199). Then, $\Delta P$ is compared with the value $P_0$ of the adjacent pixel (step S200). If $\Delta P \leq P_0$, the program returns to the step S194. At the step S 198, the comparison is executed to determine a pixel at which the sensor output sequentially increases, while at the step 200, the comparison is executed to determine a pixel at which the sensor output decreases. In other words, if an increase greater than P0 at the step S198 is found, and a decrease is found at the step S200, the aforementioned ⊓-shaped light distribution is detected.

On the other hand, if $\Delta P > \Delta P_0$ (i.e. if the answer at the step 198 is YES), the program proceeds to steps S201-S206, where it is determined in which row 91a, 91b or 91c shown in FIGS. 36A-36D the values x forming ⊓are included, thereby storing the determination results in a memory (not shown) incorporated in the CPU 88.

Similarly, if $\Delta P > P_0$ at the step S200 (i.e. if the answer is YES), the program proceeds to steps S207-S212, where it is determined in which row 91a, 91b or 91c the values x forming ⊓ are included, thereby storing the determination results in the memory of the CPU 88. For example, if the ⊓-shape is detected at the row 91a, the x-coordinate of the leading edge of the ⊓-shape is expressed as $x_{191a}$, and that of the trailing edge is expressed as $x_{291a}$.

The resetting of $\Delta P_0$ at steps S204 and S210 is executed to increase the determination level in order to prevent the processing at the step S198 or S 200 to be executed again and again.

After that, it is determined whether or not the value y indicates the row 91a (step S213). If it indicates the row 91a (i.e. if the answer is YES), the value y is changed to indicate the row 91b (step S215), and the program returns to the step S192. However, if the value y does not indicate the row 91a (i.e. if the answer at the step S213 is NO), it is determined whether or not the value y indicates the row 91b (step S214). If the value y indicates the row 91b (if the answer is YES), the value y is changed to indicate the row 91c (step S216), followed by the program returning to the step S192. Thus, the ⊓-shaped distribution is determined.

However, in the determination of ⊓-shaped distribution described so far, it is possible that the distribution has a ⊔shape. In light of this, it is necessary to confirm whether the x-coordinate of a leading edge is lower than that of a trailing edge. Specifically, the x-coordinate $x_{291a}$ of the trailing edge is compared with that $x_{191a}$ of the leading edge (step S217). Unless $x_{291a} > x_{191a}$ (i.e. if the answer is NO), the width of the ⊓-shape is set at 0 (step S218), whereas if the answer is YES, the width $\Delta x_{191a}$ of the ⊓-shape is calculated as the difference between the x-coordinates of the leading and trailing edges (step S219).

Similarly, it is confirmed that the x-coordinate $x_{291b}$ or $x_{291c}$ of a trailing edge is lower than that $x_{191b}$ or $x_{191c}$ of a leading edge (step S220 or S223). If the answer is NO, the width of the ⊓-shape is set at 0 (step S221 or S224), whereas if the answer is YES, the width $\Delta x_{91b}$ or $\Delta x_{91c}$ of the ⊓-shape is calculated as the difference between the x-coordinates of the leading and trailing edges (Step S222 or S225).

It is determined whether or not the widths sequentially increase $\Delta x_{191a} \leq \Delta x_{91b} < \Delta x_{91c}$ (steps S226 and S227). If this formula is not satisfied (i.e. if the answer at the step S226 or S227 is NO), it is determined that no head or shoulder of a person is detected from an upper portion of the photography screen as shown in FIGS. 36C and 36D, thereby executing distance measurement at the center of the photography screen (step S228), followed by the program returning to the start (it is controlled so as to determine the answer at the step S173 in FIG. 35 is NO).

On the other hand, if it is determined at the steps S226 and S227 that the widths sequentially increase $\Delta x_{91a} < \Delta x_{91b} < \Delta x_{91c}$ (i.e. if the answers at the steps S226 and S227 are YES), it is determined whether or not any ⊓shape is detected at the middle row 91b (step S229). If any ⊓shape is not detected ($\Delta x_{91b} = 0$) (i.e. if the answer at the step S229 is YES), it is determined that the to-be-photographed scene is a scene as shown in FIG. 36D, thereby chiefly executing distance measurement at a point (x: substantially the center of a ⊓shape, y: the row 91c or a row near it) (step S230). On the other hand, if a ⊓shape is detected (i.e. if the answer at the step S229 is NO), it is determined that the to-be-photographed scene is a scene as shown in FIG. 36C, thereby chiefly executing distance measurement at a point (x: $(x_{291a} + x_{191a})/2$, i.e. the center of the ⊓shape, y: the row 91b) (step S231).

Figure 35:
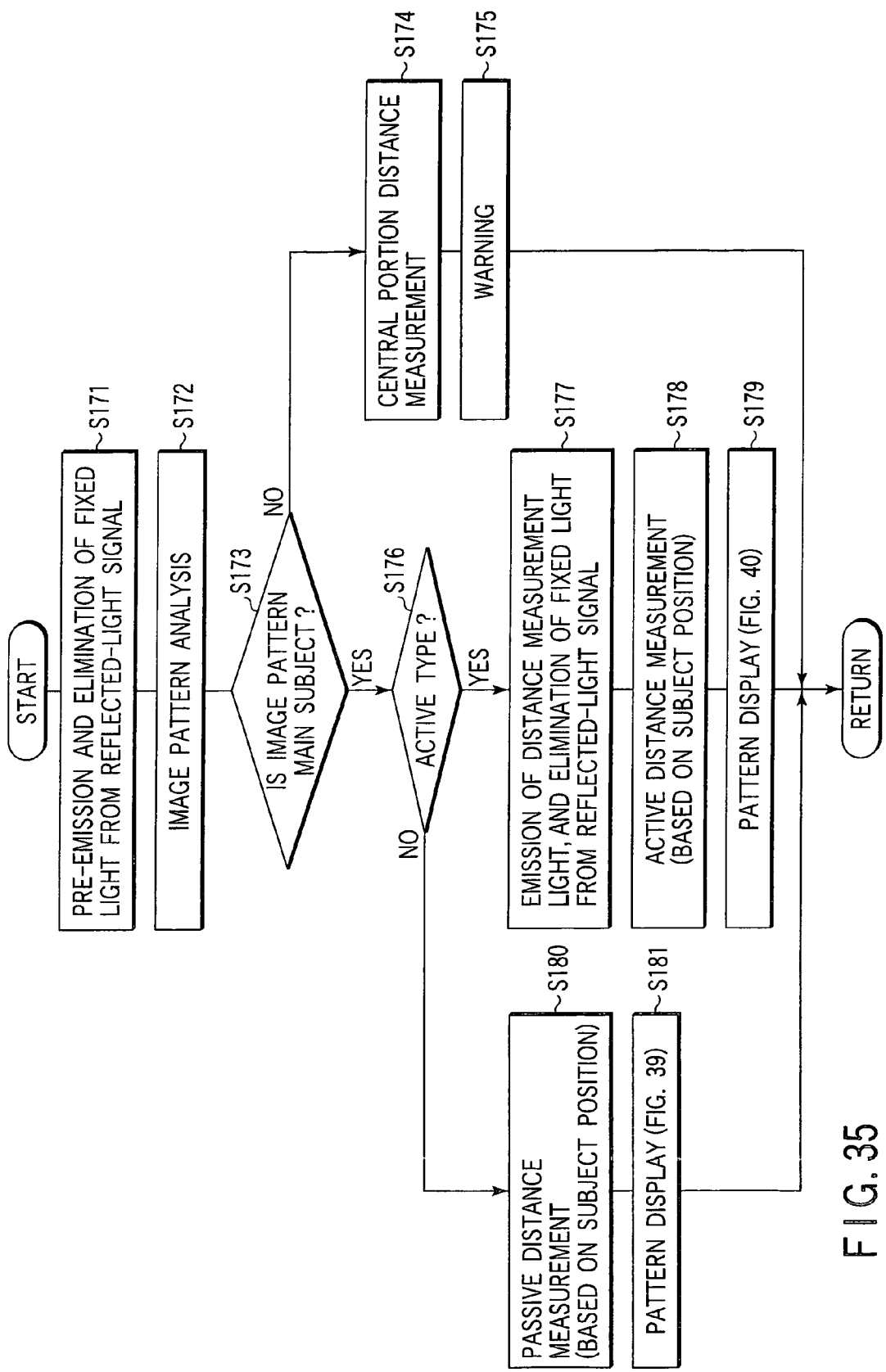
FIG. 35 is a flowchart useful in explaining distance measurement executed by the distance-measuring device according to the ninth embodiment of the invention.
Figure 36D:
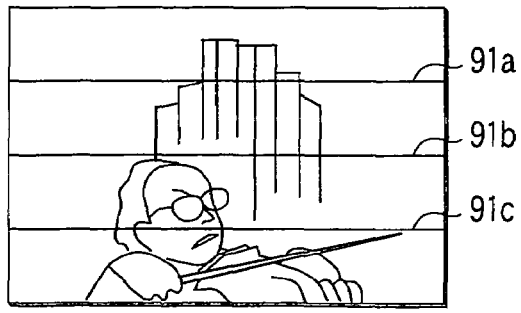

Thus, after the step S230 or S231, the program returns to the step S173 of FIG. 35.

FIG. 35 will be further described.

If, at the step S173, the image pattern cannot be determined to be a main subject, i.e. if the position of a main subject cannot be determined (if the answer is NO), one of the active type method and the passive type method is selected in light of, for example, brightness information, thereby chiefly executing distance measurement at a central portion of the photography screen, at which it is highly probable that a main subject will exist (step S174).

In this determination, it is sufficient if, for example, the active type method is selected when the edge-height $\Delta P_0$ of the ⊓shape is high and hence the effect of light projection is considered high. This processing enables automatic detection of a person not only in a scene as shown in FIG. 36C but also in a scene as shown in FIG. 36D. Accordingly, it can be determined at the step S173 of FIG. 35 whether or not the subject is a person.

At the same time, the CPU 88 selects, from pre-stored patterns, a message pattern indicating that the position of the main subject cannot be determined and hence distance measurement is executed at a central portion of the photography screen, thereby warning the user using a voice generating section 89 (step S175).

On the other hand, if the image pattern is determined to be a main subject at the step S173 (i.e. the answer at the step S173 is YES), it is determined whether distance measurement should be executed by the active type method or the passive type method, on the basis of the intensity or the contrast of an image signal (light signal) for forming the image pattern (step S176).

Figure 40:
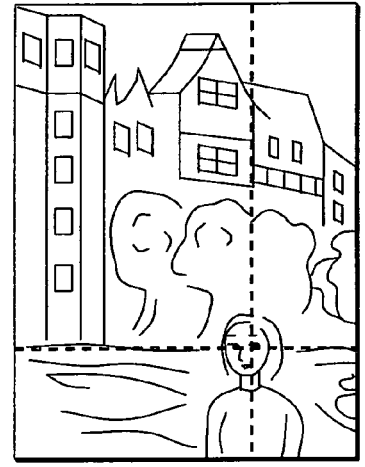
FIG. 40 is a view showing another example of the subject displayed on the liquid crystal display in the viewfinder of the camera.

If the image signal (light signal) does not provide a sufficient contrast (i.e. if the answer at the step S176 is YES), distance measurement is executed using the active type method. Accordingly, the projecting section 82 again projects light onto the subject 81 while the fixed-light eliminating circuit 90 is operated, thereby eliminating fixed light from a reflected-light signal entering the area sensors 86a and 86b to extract only an image signal contained in the reflected-light signal (step S177). Then, active-type distance measurement is chiefly executed in the position of the main subject determined by the pre-emission process (step S178). At this time, the liquid crystal display provided in the viewfinder may be controlled so as to display the selected subject position as a target as shown in FIG. 40 (step S179).

Figure 39:
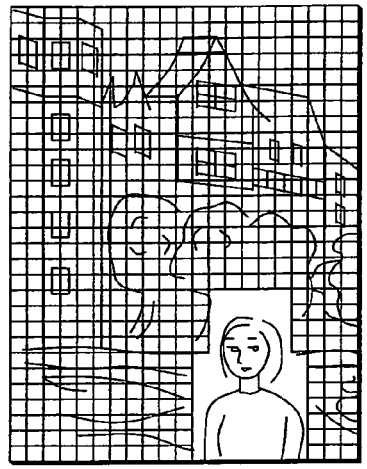
FIG. 39 is a view showing an example of a subject displayed on a liquid crystal display in the viewfinder of a camera.

If it is determined at the step S176 that the image signal is weak (i.e. if the answer is NO), distance measurement is executed using the passive type method in which an image signal from the already detected main subject position is chiefly used (step S180). At this time, the liquid crystal display in the viewfinder may display the selected subject position as shown in FIG. 39.

In accordance with the distance measurement method or the determination as to whether or not a main subject is detected, the CPU 88 selects the way of display and informs the user of the selected result, whereby the conditions for photography will be understandable and hence reliable distance measurement can be executed.

As described above, in the embodiment, the combination of the active type method and the passive type method enables accurate detection of a main subject. Various types of simple methods can be used to detect whether or not light received by a sensor is that reflected from a subject.

Figures 41A, 41B, 41C:
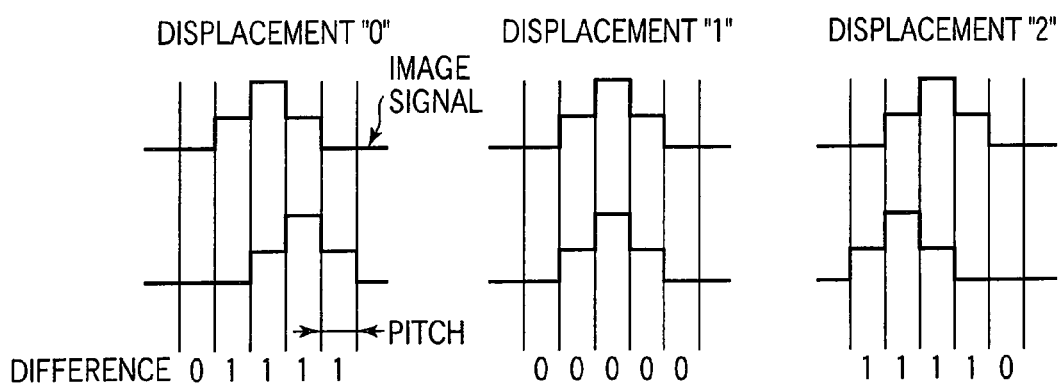
FIGS. 41A, 41B and 41C are views illustrating two sensor outputs (image signals) and amounts of deviation therebetween.

Referring to FIGS. 41A, 41B and 41C, a description will be first given of how more highly accurate distance measurement is executed when the sensor for distance measurement has a finer pitch.

When, for example, calculating the relative positional difference between the outputs (image signals) of two sensor arrays (62a and 62b in FIG. 29) of a distance-measuring device, the difference (correlation) between the two sensors is calculated while displacing the two sensor outputs in units of one pitch as shown in FIGS. 41A, 41B and 41C. Since the sum (correlation function) of the differences is minimum when the two outputs are identical to each other (FIG. 41B), the amount of displacement can be determined.

In the case shown in FIGS. 41A, 41B and 41C, the sum of differences is "0" when the relative displacement is "1". Actually, the correlation between the two outputs is maximum when the displacement is between "0" and "1". However, the finer the pitch, the more it is difficult to obtain such an intermediate value. Therefore, it is necessary to increase the accuracy of A/D conversion as much as possible. As a result, the degree of accuracy of displacement determination and the accuracy of the distance measuring function are enhanced.

However, a lot of time is required to accurately detect each sensor output. Moreover, when detecting the position of a main subject from a wide area in the photography screen, if each sensor is made to capture an image signal at the same high accuracy and resolution as in the case of distance measurement, great increases in the time lag will be inevitable. In light of this, it is necessary to more reduce the image signal processing period of each sensor when a wider area is to be scanned.

To this end, a method, as aforementioned, for degrading the accuracy of A/D conversion to increase the processing speed, or a method for roughening the image capture pitch may be used.

When, in the latter method, capturing an image indicated by reference numeral 62a' and included in a scene as shown in FIG. 42A, it is sufficient if a fine pitch as shown in FIG. 42C is used for distance measurement, and a rough pitch as shown in FIG. 42B is used for subject determination.

On the other hand, where, in the former method, a sensor array is formed of sensors 101-104 as shown in FIG. 43, the outputs of the sensors 101 and 103 are added to the outputs of the sensors 102 and 104, respectively, and then integrated.

Since, in this method, integration circuits 105 and 106 do not execute integration processing, a CPU 61 reads, via an A/D converter 70, only the outputs of integration circuits 107 and 108, which are each obtained by integrating the sum of the outputs of adjacent sensors. As a result, the time required for monitoring image signals from the entire to-be-photographed area is reduced by half.

The CPU 61 uses a switch section 109 to control switches 110, 111 and 112 so as to switch the roughness of an image between subject determination processing and distance measurement processing.

Figure 44A:
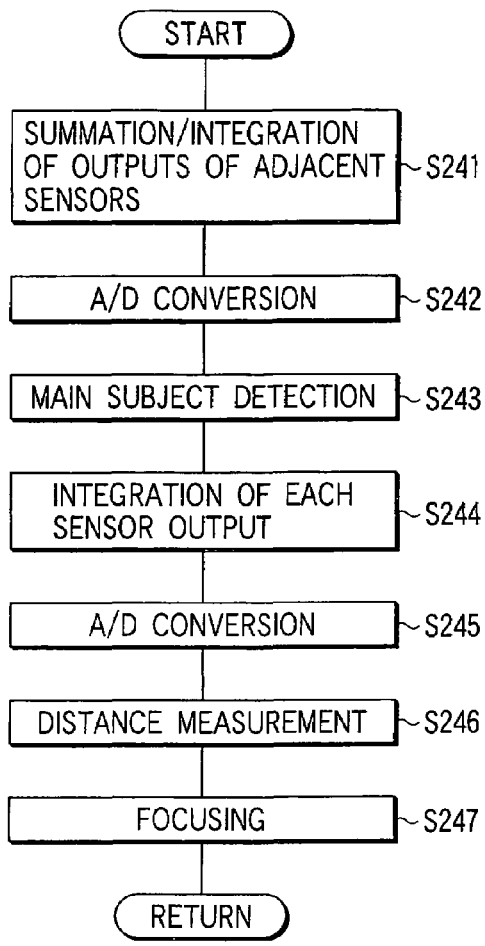
FIGS. 44A and 44B are flowcharts useful in explaining operations for switching over the pixel pitch.

Referring to the flowchart of FIG. 44A, image capture processing using the summation/integration of sensor outputs will be described.

First, the sum of the outputs of adjacent pixels (sensors) is integrated as aforementioned (step S241), and the integration value is subjected to A/D conversion (step S242).

From an image signal obtained by the A/D conversion, a main subject is detected (step S243). The output of each sensor is integrated (step S244), and the resultant integration value is subjected to A/D conversion (step S245). After that, distance measurement is executed using the active type method or the passive type method (step S246), thereby executing focusing on the basis of the distance measurement result (step S247).

Figure 44B:
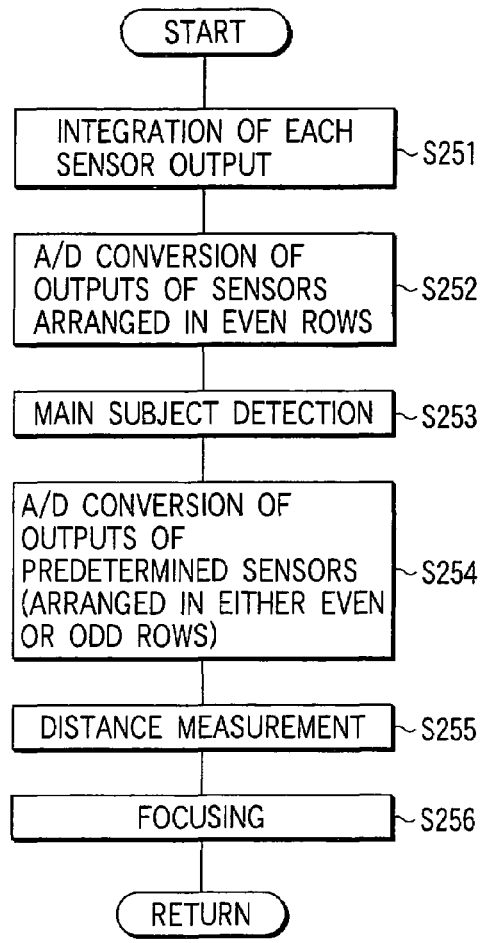

Referring to the flowchart of FIG. 44B, a description will be given of image capture processing using sensors selected by skipping.

First, the output of each sensor is integrated (step S251). Subsequently, only the integration values of sensors arranged in even rows are subjected to A/D conversion (step S252), thereby detecting a main subject from the A/D converted image signal (step S253). After the area of the main subject is more narrowed, the integration values of sensors arranged in both odd and even rows in the area are subjected to A/D conversion (step S254). Thereafter, active type or passive type distance measurement is executed (step S255), thereby executing focusing based on the distance measurement result (step S256).

As described above, when detecting a main subject, the outputs of only sensors arranged in even rows may be subjected to A/D conversion, and after the area of the subject is narrowed, the outputs of sensors arranged in even and odd rows in the narrowed area may be subjected to A/D conversion.

In the above-described embodiment, high-speed main subject detection can be executed by switching the accuracy of image determination.

A tenth embodiment of the invention will now be described.

This embodiment is a modification of the ninth embodiment, in which the roughness of the pitch of two-dimensionally arranged pixels (sensors) is changed.

Figures 45A, 45B:
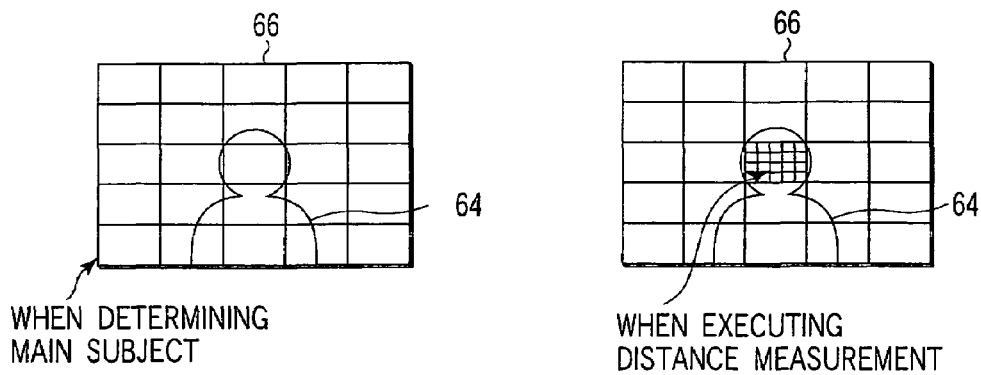
FIGS. 45A and 45B are views useful in explaining accuracies of the positions of a main subject during determination and during distance measurement.

In this embodiment, the position of a main subject is determined by sensors arranged with a rough pitch, as shown in FIG. 45A, while only a predetermined portion (e.g. face) of the main subject is detected with high accuracy as shown in FIG. 45B. FIG. 46 shows an example of a switch circuit for switching the roughness of the pitch.

In this structure, sensors 121a, 121b-125a, 125b are arranged in two rows a and b, switch groups SW 126a, 126b-127a, 127b are arranged on opposite sides of each of the sensors, and integration circuit groups 128a and 128b are opposed to the sensors with the switch groups SW 126a, 126b interposed therebetween.

The structure of this embodiment further comprises an A/D converter 129a for A/D converting the integration value of each sensor 121a-125a, a sum/integration circuit 130 for summing the outputs of the sensors 121a-125a and 121b-125b and integrating the summing result, an A/D converter 129b for A/D converting the integration result, a CPU 131 for computing the results of the A/D converters 129a and 129b, and a switch circuit 132 for switching the switch groups SW 126a, 126b, 127a and 127b under the control of the CPU 131.

In this structure, the outputs of the sensors are individually subjected to A/D conversion with the switch groups SW 126a and 126b kept on and the switch groups SW 127a and 127b kept off, or the outputs of the sensors are added and integrated by the sum/integration circuit 130 (with the switch groups SW 126a and 126b kept off and the switch groups SW 127a and 127b kept on), or the CPU 131 switches the pitch roughness or the area for image detection in accordance with the situation.

As described above, the tenth embodiment can realize more efficient and faster main subject determination by two-dimensionally switching the roughness of an image.

An eleventh embodiment of the invention will be described.

Figure 47:
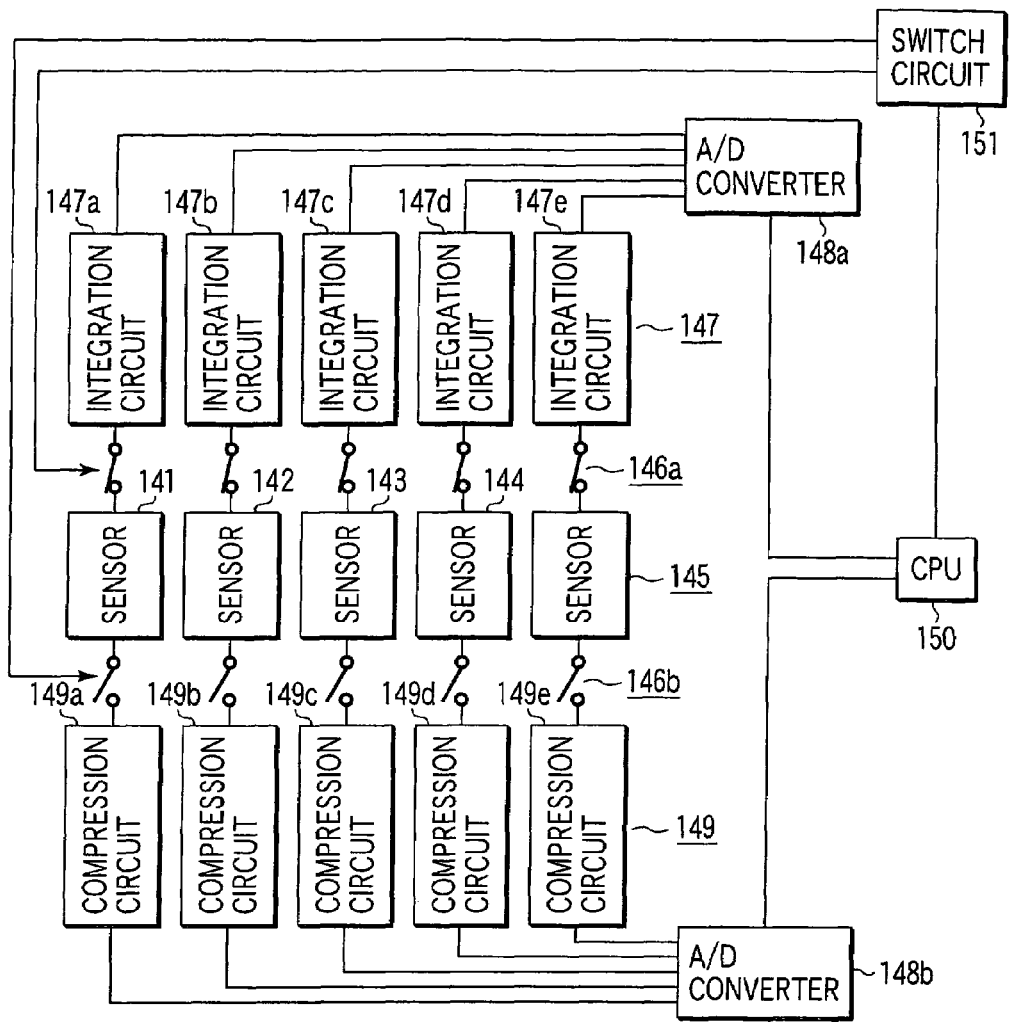
FIG. 47 is a view showing an example of a structure of a switch circuit incorporated in a distance-measuring device according to an eleventh embodiment of the invention.

FIG. 47 shows a structure obtained by further developing the tenth embodiment. In this structure, one of simple integration control and compression control is selectively executed on the output of each sensor.

Also in this structure, sensors 141-145 are arranged, integration circuits 147a-147e are respectively connected to ends of the sensors 141-145 via respective switches SW 146a that operate simultaneously, and the integration outputs of the integration circuits are supplied to an A/D converter 148a. The other ends of the sensors 141-145 are respectively connected to compression circuits 149a-149e via respective switches SW 146b that operate simultaneously. The compression outputs of the compression circuits are supplied to an A/D converter 148b.

Figure 48:
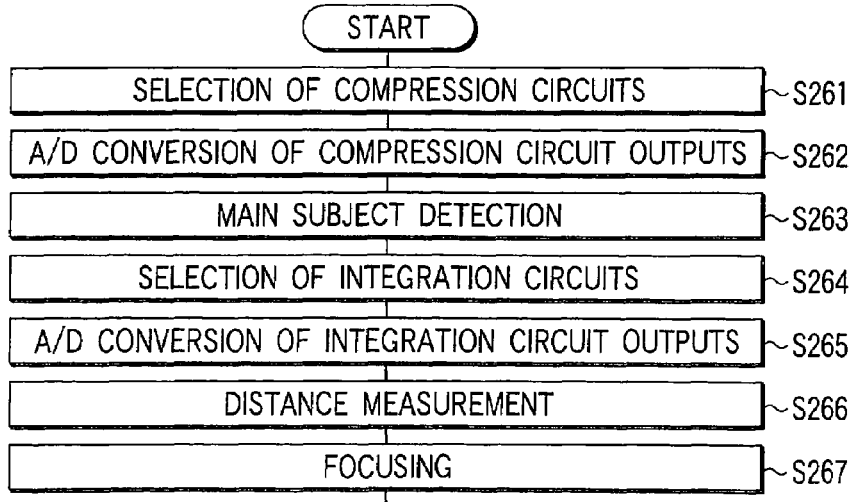
FIG. 48 is a flowchart useful in explaining a switchover operation of the switch circuit incorporated in the distance-measuring device according to the eleventh embodiment of the invention.

Referring to the flowchart of FIG. 48, the operation of the above structure will be described.

First, the switch SW group 146a is turned off and the switch SW group 146b are turned on, thereby causing the outputs of the sensors 141-145 to be output to the compression circuits 149a-149e, respectively (step S261). Sensor outputs obtained by logarithmic compression of the compression circuits 149a-149e are output to a CPU 150 via the A/D converter 148b (step S262). The CPU 150 detects a main subject on the basis of the sensor outputs (step S263).

Subsequently, the switch SW group 146a is turned on and the switch SW group 146b are turned off, thereby selecting the integration circuits 147a-147e. Sensor outputs obtained by integration are output to the CPU 150 via the A/D converter 148a (step S264). The CPU 150 detects a main subject on the basis of the sensor outputs (step S265). After that, distance measurement is executed using one of the active type method and the passive type method (step S266), thereby executing focusing on the basis of the distance measurement result (step S267).

When, as described above, the switch SW group 146a is selected, linear integration outputs, known in the prior art, are supplied to the CPU 150 via the A/D converter 148a. On the other hand, when the switch SW group 146b is selected, the sensor outputs are subjected to logarithmic compression using the I/V distinctive of, for example, diodes. As a result, the sensor outputs are supplied in the form of non-linear outputs, which increase by one step each time the input signal level is doubled, to the CPU 150 via the A/D converter 148b.

Since the non-linear output significantly widens the dynamic range of the sensor although it degrades its accuracy, it is very effective when a to-be-photographed scene with a high contrast as shown in FIG. 49A is subjected to whole image determination. In other words, when an image has significant differences in terms of accuracy, accurate image data can be obtained from only part of the image as shown in FIG. 49B, if linear integration is executed. However, if a non-linear output circuit is used, it can provide an output distribution corresponding to a wide brightness distribution as shown in FIG. 49C. Accordingly, when detecting a main subject, non-linear processing is preferable.

In light of this, when in this embodiment, detecting a main subject in a to-be-photographed scene as shown in FIG. 49A, a logarithmic compression type output circuit is used, which has a relatively low accuracy but a wide dynamic range. On the other hand, when executing distance measurement in a specified area (e.g. a face as shown in FIG. 45B), an integration circuit is used, which has a narrow dynamic range but a highly-accurate linear output distinctive, thereby executing highly accurate distance measurement. This switching of processing enables determination of a main subject at a high speed, and also enables selection, from a wide area, of a narrow area in which distance measurement is to be executed, and execution of highly accurate focusing on the selected area.

As described above in detail, the present invention provides a compact and cost-effective distance-measuring device having a wide distance-measuring area and capable of detecting a main subject with a small time lag, the distance-measuring device comprising an AF area sensor, which includes an image pick up element formed on a semiconductor substrate for receiving input image signals having a parallax therebetween, and a photo reception signal processing circuit formed on the semiconductor substrate for creating data by processing an image of a subject based on the output of the image pick up element. Moreover, the invention provides, without increasing the cost, a distance-measuring device which can determine, before distance measurement, an object in a to-be-photographed scene, a distance to which is to be measured, to thereby determine a distance-measuring point for the object, and accordingly which can deal with various situations. In addition, since in the distance-measuring device, different data reading methods are used between the determination of a main subject and the execution of distance measurement, a high-speed and highly-accurate operation is realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device which measures data regarding a distance to an object, the device comprising:
   two optical systems having a parallax therebetween;
   an image pick up element formed on a semiconductor substrate for picking up two images formed by the optical systems;
   image processing means formed on the semiconductor substrate for processing an image output from the image pick up element, the image processing means having a low resolution mode for generation of low resolution data from an image output of the image pick up element, and a high resolution mode for generation of high resolution data from an image output of the image pick up element;
   main subject detecting means for detecting a main subject on the basis of the low resolution data generated by the image processing means; and
   distance-measuring means for executing a distance measurement operation, based on the high resolution data generated by the image processing means, on the main subject detected by the main subject detecting means.

2. The device which measures data regarding the distance to an object according to claim 1, wherein the image processing means has a variable image resolution.

3. The device which measures data regarding the distance to an object according to claim 1, wherein the image processing means can individually generate the low resolution data to the main subject detecting means and the high resolution data to the distance-measuring means.

4. A camera including a device which measures data regarding a distance to an object, the device comprising:
   a photographic optical system having an adjustable focus;
   a distance-measuring optical system for dividing an image of a subject into two images;

an image pick up element formed on a semiconductor substrate for picking up the two images divided by the distance-measuring optical system;

an image processing circuit formed on the semiconductor substrate and capable of outputting low resolution data and high resolution data by processing an image output from the image pick up element; and a computing circuit for detecting a main subject on the basis of the low resolution data output from the image processing circuit, and outputting a focus adjusting signal to the photographic optical system, using the high resolution data output from the image processing circuit.

* * * * *